(12) United States Patent
Sengupta et al.

(10) Patent No.: US 11,663,345 B2
(45) Date of Patent: *May 30, 2023

(54) METHODS AND APPARATUS FOR INVOKING A SECURITY FEATURE OF A COMPUTING DEVICE DISPLAY IN RESPONSE TO DETECTING AN ONLOOKER BASED ON DEPTH DATA

(71) Applicant: Intel Corporation, Santa Clara, CA (US)

(72) Inventors: Uttam Sengupta, Portland, OR (US); Soethiha Soe, Beaverton, OR (US); Divyashree-Shivakumar Sreepathihalli, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/454,765

(22) Filed: Nov. 12, 2021

(65) Prior Publication Data
US 2022/0067178 A1 Mar. 3, 2022

Related U.S. Application Data

(63) Continuation of application No. 16/405,463, filed on May 7, 2019, now Pat. No. 11,205,008.

(51) Int. Cl.
*G09G 5/00* (2006.01)
*G06F 21/60* (2013.01)
(Continued)

(52) U.S. Cl.
CPC .............. *G06F 21/604* (2013.01); *G06T 7/50* (2017.01); *G09G 3/20* (2013.01); *G09G 5/003* (2013.01);
(Continued)

(58) Field of Classification Search
CPC ......... G06F 21/604; G09G 3/20; G09G 5/003
See application file for complete search history.

(56) References Cited

U.S. PATENT DOCUMENTS 10,215,858 B1 2/2019 Klein et al.
10,841,174 B1* 11/2020 Ely .................... G02B 27/0172
(Continued)

OTHER PUBLICATIONS

Whittaker, "HP Spectre X360 has a built-in privacy screen," dated Jan. 25, 2018, retrieved from [https://www.zdnet.com/article/hp-spectre-x360-built-in-instant-privacy-screen/] on Mar. 11, 2019, 14 pages.

(Continued)

*Primary Examiner* — Samantha (Yuehan) Wang
(74) *Attorney, Agent, or Firm* — Hanley Flight & Zimmerman LLC

(57) ABSTRACT

Methods and apparatus for invoking a security feature of a computing device display in response to detecting an onlooker based on depth data are disclosed. An example apparatus includes at least one memory, computer-readable instructions, and processor circuitry, The processor circuitry is to execute the computer-readable instructions to automatically invoke an onlooker detection model of a computing device in response to determining that the computing device is located in a public, unsecure environment. The onlooker detection model is to detect an onlooker based on data collected by a sensor associated with the computing device. The processor circuitry is to execute the computer-readable instructions to automatically invoke a security feature of a display of the computing device in response to detection of the onlooker.

22 Claims, 9 Drawing Sheets

(51) Int. Cl.
*G06T 7/50* (2017.01)
*G09G 3/20* (2006.01)

(52) U.S. Cl.
CPC ..... *G09G 2354/00* (2013.01); *G09G 2358/00* (2013.01)

(56) References Cited

U.S. PATENT DOCUMENTS

| | | | |
|---|---|---|---|
| 2014/0201844 A1* | 7/2014 | Buck | G06F 21/554 726/26 |
| 2015/0054739 A1 | 2/2015 | Itoh | |
| 2019/0220697 A1 | 7/2019 | Kiemele et al. | |
| 2019/0258807 A1* | 8/2019 | DiMaggio | G06F 21/577 |
| 2019/0266337 A1* | 8/2019 | Sengupta | G06V 40/161 |

OTHER PUBLICATIONS

United States Patent and Trademark Office, "Non-Final Office Action," issued in connection with U.S. Appl. No. 16/405,563, dated Apr. 23, 2021, 15 pages.

United States Patent and Trademark Office, "Final Office Action," issued in connection with U.S. Appl. No. 16/405,563, dated Jul. 27, 2021, 16 pages.

United States Patent and Trademark Office, "Notice of Allowance and Fee(s) Due," issued in connection with U.S. Appl. No. 16/405,563, dated Sep. 10, 2021, 8 pages.

United States Patent and Trademark Office, "Corrected Notice of Allowability," issued in connection with U.S. Appl. No. 16/405,563, dated Oct. 20, 2021, 2 pages.

* cited by examiner

US 11,663,345 B2

METHODS AND APPARATUS FOR INVOKING A SECURITY FEATURE OF A COMPUTING DEVICE DISPLAY IN RESPONSE TO DETECTING AN ONLOOKER BASED ON DEPTH DATA

RELATED APPLICATIONS

This patent arises from a continuation of U.S. patent application Ser. No. 16/405,463, filed May 7, 2019, entitled "Methods and Apparatus for Invoking a Security Feature of a Computing Device Display in Response to Detecting an Onlooker Based on Depth Data." The entirety of U.S. patent application Ser. No. 16/405,463 is hereby incorporated herein by reference. Priority to U.S. patent application Ser. No. 16/405,463 is claimed.

FIELD OF THE DISCLOSURE

This disclosure relates generally to methods and apparatus for invoking a security feature of a computing device display and, more specifically, to methods and apparatus for invoking a security feature of a computing device display in response to detecting an onlooker based on depth data.

BACKGROUND

Computing device displays are routinely utilized to present information to end users of the computing devices. In some situations, information presented via a display of a computing device may be of a sensitive (e.g., confidential and/or proprietary) nature. An end user may have occasion (e.g., either by necessity or by desire) to view sensitive information via a display of a computing device at a location and/or in an environment which offers the end user little to no privacy. For example, an end user of a computing device may have occasion to view sensitive information via a display of the computing device at a location outside of the end user's workplace or home, and/or in an environment which is generally accessible to the public (e.g., a library, a coffee shop, an airport, etc.). When such occasions arise, the end user may have an interest in invoking one or more security feature(s) of the display of the computing device to reduce (e.g., prevent) onlookers (e.g., shoulder surfers) from being able to view sensitive information presented on the display.

Figure 1:
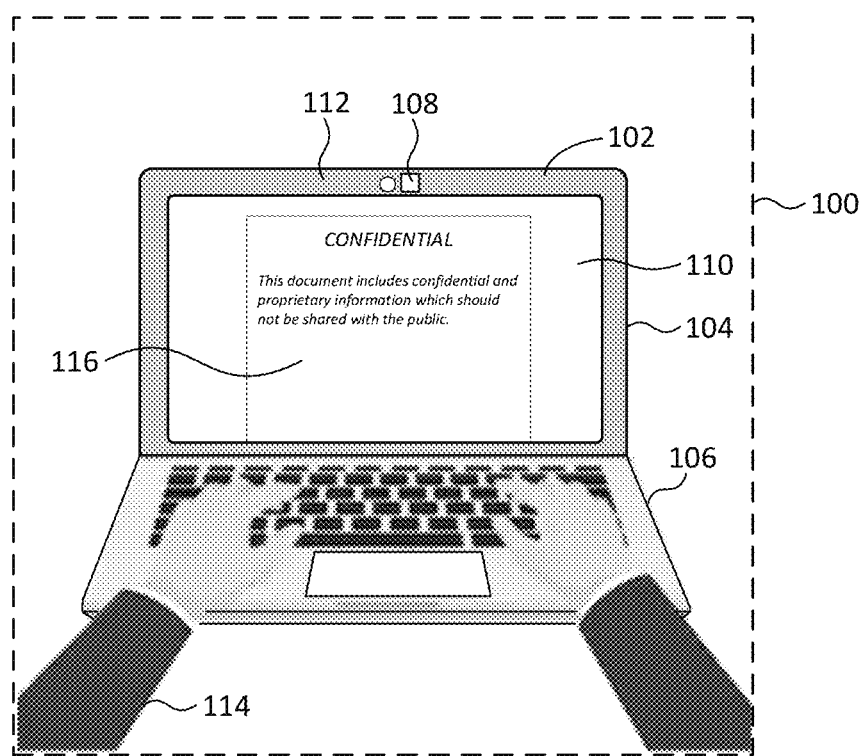
FIG. 1 illustrates an example environment in which an example computing device may implement methods and apparatus in accordance with teachings of this disclosure to invoke a security feature of an example display of the computing device in response to detecting an onlooker based on depth data.

Certain examples are shown in the above-identified figures and described in detail below. In describing these examples, identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

An end user of a computing device (e.g., a laptop computer, a desktop computer, a tablet, a smartphone, etc.) may have occasion to view sensitive information via a display of the computing device at a location outside of the end user's workplace or home, and/or in an environment which is generally accessible to the public (e.g., a library, a coffee shop, an airport, etc.). When such occasions arise, the end user may have an interest in invoking one or more security feature(s) of the display of the computing device to reduce (e.g., prevent) onlookers (e.g., shoulder surfers) from being able to view sensitive information presented on the display.

Known solutions to the above-described security/privacy problem detect the presence of an onlooker based on image data obtained from an RGB camera of the computing device (e.g., a forward-facing RGB camera mounted on and/or embedded in the bezel of the display of the computing device). In response to detecting an onlooker based on the image data, such known solutions provide the end user with a notification indicating that an onlooker has been detected, and/or indicating that a security feature (e.g., a privacy screen) of the display of the computing device is available to be invoked by the end user. The end user must then manually interact with (e.g., provide a user input to) the computing device to cause the security feature to be invoked.

The known solutions described above have several drawbacks. As one drawback, such known solutions can raise privacy concerns. For example, the image data obtained from the RGB camera of the computing device may enable facial recognition techniques to be applied to the onlooker without his/her knowledge and/or authorization. As another example, the location at which the RGB camera of the computing device obtains the image data may have a privacy policy that prohibits image capture and/or video recordings at the location.

As another drawback, such known solutions rely on manual input from the end user, subsequent to an onlooker being detected, to invoke the security feature of the display of the computing device. Relying on such manual input from the end user causes delay in the response time of the solution, and such delay provides the onlooker with a greater opportunity to view the information being presented on the display of the computing device prior to the security feature becoming invoked. Furthermore, the end user may find repeated prompts (e.g., as may occur in a busy environment) requesting such manual input to be an inconvenience to the end user.

Unlike the known solutions described above, example methods and apparatus disclosed herein automatically invoke a security feature of a display of a computing device in response to detecting an onlooker based on depth data. Example methods and apparatus disclosed herein advantageously detect onlookers based on depth data obtained from one or more depth sensor(s) (e.g., an infrared sensor, a radio detection and ranging (RADAR) sensor, a light detection and ranging (LIDAR) sensor, an ultra-wideband (UWB) sensor, an ultrasonic sensor, a time-of-flight (TOF) sensor, an image sensor, etc.) of a computing device. In contrast to the image data obtained via the known solutions described above, the depth data obtained via example methods and apparatus disclosed herein is anonymous. The use of such anonymous depth data, as opposed to invasive image data from which the identity of an individual can be determined, reduces (e.g., eliminates) any privacy concerns that might arise in connection with implementing example methods and apparatus disclosed herein at certain locations and/or in certain environments. As an additional advantage, the depth sensor(s) may consume an amount of power in connection with capturing and/or collecting the depth data that is lower (e.g., substantially less) than the amount of power consumed by a camera in connection with capturing and/or collecting image data that is equivalent to the depth data.

Example methods and apparatus disclosed herein also advantageously automate the process of invoking a security feature of a display of a computing device in response to detecting an onlooker. In contrast to the known solutions described above, example methods and apparatus disclosed herein automatically invoke a security feature of a display of a computing device in response to detecting an onlooker, and do so without relying on manual input from an end user subsequent to an onlooker being detected. Eliminating the need for manual input from the end user to invoke the security feature advantageously improves (e.g., decreases) the response time associated with invoking the security feature of the display subsequent to an onlooker being detected, thereby reducing (e.g., eliminating) the possibility that the onlooker might be able to view the information being presented on the display of the computing device prior to the security feature becoming invoked. Eliminating the need for manual input from the end user to invoke the security feature also advantageously reduces (e.g., eliminates) repeated prompts to the end user requesting such manual input, and accordingly provides for an improved end user experience relative to that provided by the known solutions described above.

FIG. 1 illustrates an example environment 100 in which an example computing device 102 may implement methods and apparatus in accordance with teachings of this disclosure to invoke a security feature of an example display 104 of the computing device 102 in response to detecting an onlooker based on depth data. The environment 100 of FIG. 1 can be any type of environment including, for example, a generally private environment (e.g., a workplace of an end user, a home of an end user, etc.) or a generally public environment (e.g., a library, a coffee shop, an airport, etc.). The computing device 102 of FIG. 1 can be implemented by and/or as any type of computing device including, for example, a laptop computer, a desktop computer, a tablet, a smartphone, etc. The display 104 of FIG. 1 can be implemented by and/or as any type of display including, for example, a cathode ray tube (CRT) monitor, a liquid crystal display (LCD) monitor, a light-emitting diode (LED) monitor, a touchscreen, etc. In the illustrated example of FIG. 1, the environment 100 is a generally public environment, the computing device 102 is a laptop computer, and the display 104 is an LED monitor.

The computing device 102 of FIG. 1 includes the display 104, an example housing 106, and one or more example depth sensor(s) 108. The housing 106 of the computing device 102 houses, carries and/or encases one or more processing and/or memory component(s), module(s) and/or unit(s) of the computing device 102. The depth sensor(s) 108 sense(s), measure(s) and/or detect(s) depth data of objects (e.g., humans) located within the environment 100 of FIG. 1 and within a field of view of the depth sensor(s) 108 relative to the location of the display 104. The depth sensor(s) 108 of FIG. 1 can be implemented by any number and/or any type of depth-measuring and/or range-measuring sensor(s) that is/are configured to sense, measure and/or detect depth data that is anonymous (e.g., depth data from which the identity of an individual cannot be determined). For example, the depth sensor(s) 108 of FIG. 1 can be implemented by any number (e.g., 1, 2, 3, etc.) of infrared sensors, RADAR sensors, LIDAR sensors, UWB sensors, ultrasonic sensors, TOF sensor, image sensors, etc.

In the illustrated example of FIG. 1, the display 104 is operatively coupled to (e.g., in wired or wireless electrical communication with) one or more processing and/or memory component(s), module(s) and/or unit(s) located within, carried by, and/or attached to the housing 106 of the computing device 102. Additionally, the display 104 is physically coupled to (e.g., hinged to) the housing 106 of the computing device 102.

In other examples, such as when the computing device 102 is implemented as a desktop computer, the display 104 can be operatively coupled to one or more processing and/or memory component(s), module(s) and/or unit(s) located within, carried by, and/or attached to the housing 106 of the computing device 102, without the display 104 additionally being physically coupled to the housing 106 of the computing device 102. For example, the display 104 can alternatively be wirelessly connected to or more processing and/or memory component(s), module(s) and/or unit(s) located within, carried by, and/or attached to the housing 106 of the computing device 102, with no physical connection existing between the display 104 and the housing 106.

The display 104 of FIG. 1 includes an example screen 110 and an example bezel 112 bounding (e.g., surrounding the viewable area of) the screen 110. In the illustrated example of FIG. 1, the depth sensor(s) 108 is/are operatively coupled to (e.g., in wired or wireless electrical communication with) one or more processing and/or memory component(s), module(s) and/or unit(s) located within and/or attached to the housing 106 of the computing device 102. Additionally, the depth sensor(s) 108 is/are is physically coupled to (e.g., embedded in) the bezel 112 of the display 104 of the computing device 102 and oriented in a forward-facing direction such that the depth sensor(s) 108 generally point(s) toward and/or past an example end user 114 of the computing device 102.

In other examples, such as when the computing device 102 is implemented as a desktop computer, the depth sensor(s) 108 can be operatively coupled to one or more processing and/or memory component(s), module(s) and/or unit(s) located within and/or attached to the housing 106 of the computing device 102, without the depth sensor(s) 108 additionally being physically coupled to the bezel 112 of the display 104 of the computing device 102. For example, the depth sensor(s) 108 can alternatively be physically coupled to a port (e.g., a USB port) of the display 104 and/or, more generally, of the computing device 102, and oriented in a forward-facing direction such that the depth sensor(s) 108 generally point(s) toward and/or past the end user 114 of the computing device 102.

In the illustrated example of FIG. 1, the display 104 of the computing device 102 is presenting example information 116 (e.g., an electronic file) for viewing by the end user 114. In certain instances (e.g., when the information 116 is of a sensitive nature, as shown in FIG. 1), the end user 114 may have an interest in preventing other individuals (e.g., onlookers) located within the environment 100 from viewing the information 116 being presented via the display 104 of the computing device 102. The computing device 102 of FIG. 1 is configured to implement a solution to this security/privacy interest of the end user 114.

More specifically, the computing device 102 of FIG. 1 detects whether one or more onlooker(s) is/are located within the environment 100 based on depth data (e.g., anonymous depth data) obtained via the depth sensor(s) 108 of the computing device 102. In some examples, the computing device 102 detects whether the onlooker(s) is/are present within a field of view of the depth sensor(s) 108. In some such examples, the computing device 102 additionally detects whether the onlooker(s) is/are located within a proximity threshold defined by one or more boundary distance(s) from the depth sensor(s) 108.

In response to detecting that the onlooker(s) is/are present within the field of view of the depth sensor(s) 108, and/or detecting that the onlooker(s) is/are located within the proximity threshold associated with the depth sensor(s) 108, the computing device 102 of FIG. 1 automatically invokes one or more security feature(s) of the display 104 of the computing device 102. Invocation of the security feature(s) reduces (e.g., eliminates) the ability of the onlooker(s) to view the information 116 being presented via the display 104 of the computing device 102. The security feature(s) invoked by the computing device 102 of FIG. 1 can be any quantity, type, format and/or combination of feature(s) that facilitate(s) reducing the ability of an onlooker to view the information 116 being presented via the display 104 of the computing device 102.

For example, the security feature(s) can include reducing the size (e.g., the font size, the image size, etc.) of the information 116 as presented on the screen 110 of the display 104 relative to the size at which the information 116 would otherwise be presented on the screen 110 of the display 104 in the absence of a detected onlooker. The security feature(s) can additionally or alternatively include narrowing the viewable width of the information 116 as presented on the screen 110 of the display 104 relative to the viewable width at which the information 116 would otherwise be presented on the screen 110 of the display 104 in the absence of a detected onlooker. The security feature(s) can additionally or alternatively include blurring (e.g., obscuring, filtering, blacking out, etc.) the information 116 as presented on the screen 110 of the display relative to the clarity with which the information 116 would otherwise be presented on the screen 110 of the display 104 in the absence of a detected onlooker. The security feature(s) can additionally or alternatively include decreasing the brightness of the backlighting projected onto the screen 110 of the display 104 relative to the brightness at which the backlighting would otherwise be projected onto the screen 110 of the display 104 in the absence of a detected onlooker. The security feature(s) can additionally or alternatively include redirecting and/or refocusing the backlighting projected onto the screen 110 of the display 104 relative to direction and/or the focus with which the backlighting would otherwise be projected onto the screen 110 of the display 104 in the absence of a detected onlooker.

In some examples, in addition to (e.g., prior to, in conjunction with, or subsequent to) invoking one or more security feature(s) of the display 104 of the computing device 102, the computing device 102 of FIG. 1 also generates one or more notification(s) to be presented to the end user 114. In some examples, the notification(s) indicate to and/or notify the end user 114 that one or more onlooker(s) has/have been detected by the computing device 102. In some examples, the notification(s) additionally or alternatively indicate to and/or notify the end user 114 that one or more security feature(s) of the display 104 of the computing device 102 is/are being invoked or has/have been invoked by the computing device 102.

Figure 2:
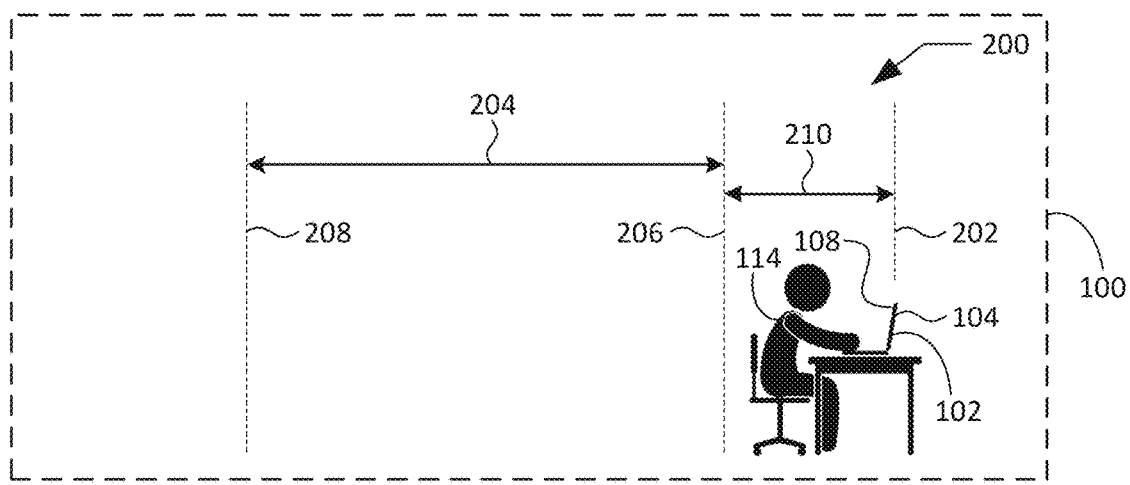
FIG. 2 illustrates a first example scenario encountered by the example computing device of FIG. 1 in connection with determining whether to invoke a security feature of the example display of the computing device of FIG. 1.
Figure 3:
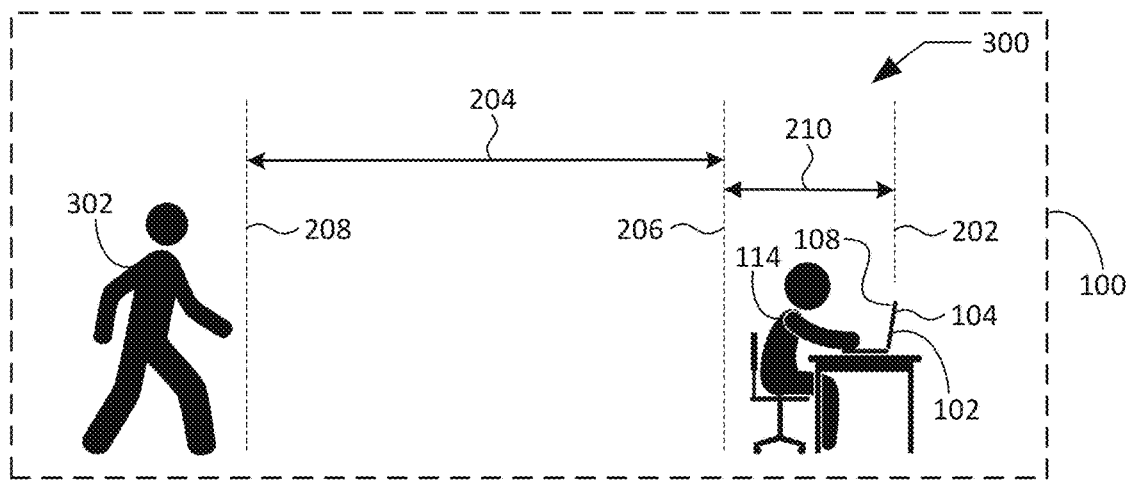
FIG. 3 illustrates a second example scenario encountered by the example computing device of FIGS. 1 and 2 in connection with determining whether to invoke a security feature of the example display of the computing device.
Figure 4:
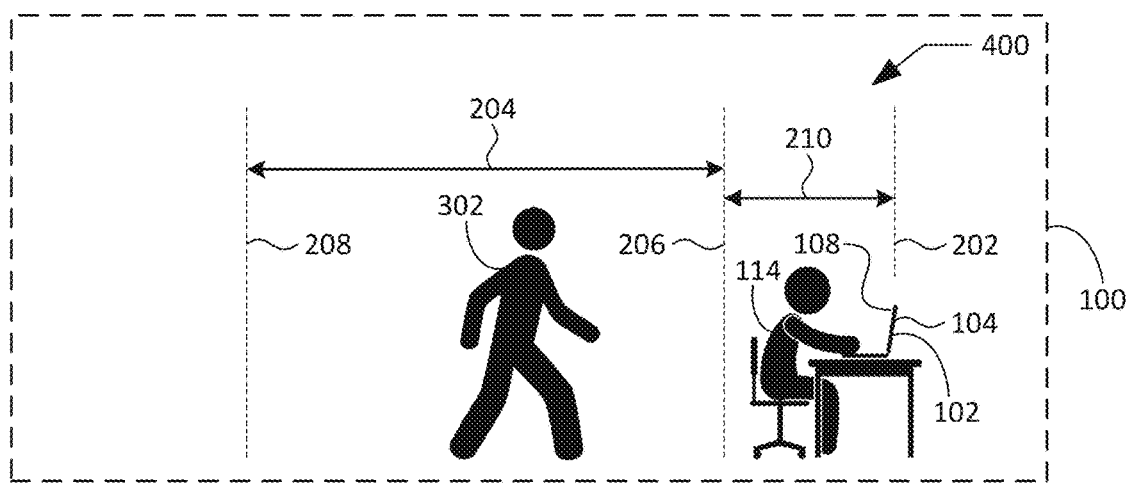
FIG. 4 illustrates a third example scenario encountered by the example computing device of FIGS. 1-3 in connection with determining whether to invoke a security feature of the example display of the computing device.

FIG. 2 illustrates a first example scenario 200 encountered by the example computing device 102 of FIG. 1 in connection with determining whether to invoke a security feature of the example display 104 of the computing device 102. FIG. 3 illustrates a second example scenario 300 encountered by the example computing device 102 of FIGS. 1 and 2 in connection with determining whether to invoke a security feature of the example display 104 of the computing device 102. FIG. 4 illustrates a third example scenario 400 encountered by the example computing device 102 of FIGS. 1-3 in connection with determining whether to invoke a security feature of the example display 104 of the computing device 102.

In the illustrated examples of the first scenario 200 shown in FIG. 2, the second scenario 300 shown in FIG. 3, and the third scenario 400 shown in FIG. 4, the depth sensor(s) 108 of the computing device 102 is/are located at an example position 202 and is/are oriented in a forward-facing direction that generally faces away from the display 104 of the computing device 102 and toward the end user 114. The depth sensor(s) 108 sense(s), measure(s) and/or detect(s) depth data of objects (e.g., humans) located within the environment 100 of FIG. 1 and within a field of view of the depth sensor(s) 108. The computing device 102 detects whether an onlooker is located within the environment 100 based on the depth data. In some examples, the computing device 102 detects whether an onlooker is/are present within the field of view of the depth sensor(s) 108. In some such examples, the computing device 102 additionally detects whether an onlooker is located within a proximity threshold defined by one or more boundary distance(s) from the depth sensor(s) 108.

For example, in the illustrated examples of the first scenario 200 shown in FIG. 2, the second scenario 300 shown in FIG. 3, and the third scenario 400 shown in FIG. 4, the computing device 102 detects, based on depth data obtained via the depth sensor(s) 108, whether an onlooker is located within a first example proximity threshold 204 defined by an example lower boundary distance 206 from the depth sensor(s) 108 and by an example upper boundary distance 208 from the depth sensor(s) 108. The computing device 102 ignores (e.g., filters out) depth data associated with objects located within a second example proximity threshold defined by the position 202 of the depth sensor(s) 108 and by the lower boundary distance 206 of the first proximity threshold 204. Ignoring (e.g., filtering out) depth data associated with the objects located within the second proximity threshold 210 prevents the computing device 102 from inadvertently detecting that the end user 114, who is located within the second proximity threshold 210, is an onlooker.

In the first scenario 200 shown in FIG. 2, no onlookers are present in the environment 100 within the field of view of the depth sensor(s) 108 of the computing device 102. When encountering and/or evaluating the first scenario 200 of FIG. 2, the computing device 102 detects, based on depth data obtained via the depth sensor(s) 108, that no onlookers are present within the field of view of the depth sensor(s) 108. The computing device 102 of FIG. 2 may additionally or alternatively detect, based on the depth data, that no onlookers are located within the first proximity threshold 204 defined by the lower boundary distance 206 and by the upper boundary distance 208. In response to such detection(s), the computing device 102 does not invoke any security features of the display 104 of the computing device 102.

In the second scenario 300 shown in FIG. 3, an example onlooker 302 is present in the environment 100 within the field of view of the depth sensor(s) 108 of the computing device 102. The location of the onlooker 302, however, is beyond the upper boundary distance 208 of the first proximity threshold 204. When encountering and/or evaluating the second scenario 300 of FIG. 3, the computing device 102 detects, based on depth data obtained via the depth sensor(s) 108, that the onlooker 302 is present within the field of view of the depth sensor(s) 108. The computing device 102 of FIG. 2 additionally or alternatively detects, based on the depth data, that the onlooker 302 is not located within the first proximity threshold 204 defined by the lower boundary distance 206 and by the upper boundary distance 208. In response to such detection(s), the computing device 102 does not invoke any security features of the display 104 of the computing device 102.

In the third scenario 400 shown in FIG. 4, the onlooker 302 is present in the environment 100 within the field of view of the depth sensor(s) 108 of the computing device 102. In contrast to the second scenario 300 shown in FIG. 3, the location of the onlooker 302 is now within the first proximity threshold 204 defined by the lower boundary distance 206 and by the upper boundary distance 208. When encountering and/or evaluating the third scenario 400 of FIG. 4, the computing device 102 detects, based on depth data obtained via the depth sensor(s) 108, that the onlooker 302 is present within the field of view of the depth sensor(s) 108. The computing device 102 of FIG. 2 additionally or alternatively detects, based on the depth data, that the onlooker 302 is located within the first proximity threshold 204 defined by the lower boundary distance 206 and by the upper boundary distance 208. In response to such detection(s), the computing device 102 automatically invokes one or more security feature(s) of the display 104 of the computing device 102. Invocation of the security feature(s) reduces (e.g., eliminates) the ability of the onlooker 302 to view information being presented via the display 104 of the computing device 102.

In some examples, the depth sensor(s) 108 of FIGS. 1-4 sense(s), measure(s) and/or detect(s) depth data over multiple zones located within the field of view of the depth sensor(s) 108. Multi-zone depth data obtained via the depth sensor(s) 108 of FIGS. 1-4 can be represented by a grid having an associated number of zones defined by the rows and columns of the grid. For example, a grid having four rows and four columns yields a total of sixteen zones, while a grid having eight rows and eight columns yields a total of sixty-four zones. The grid can include any number of rows and any number of columns, and can yield any number of zones. In some examples, a time series of the multi-zone depth data collected by the depth sensor(s) 108 may demonstrate one or more depth change(s) (e.g., a decreasing depth) associated with an object (e.g., an onlooker) located within and/or across one or more of the zone(s) representing the field of view of the depth sensor(s) 108. Furthermore, different depth data can be collected in different ones of the multiple zones as a result of signal reflections from different objects (e.g., different onlookers) located within and/or across the zone(s) at different distances from the depth sensor(s) 108.

Figure 5:
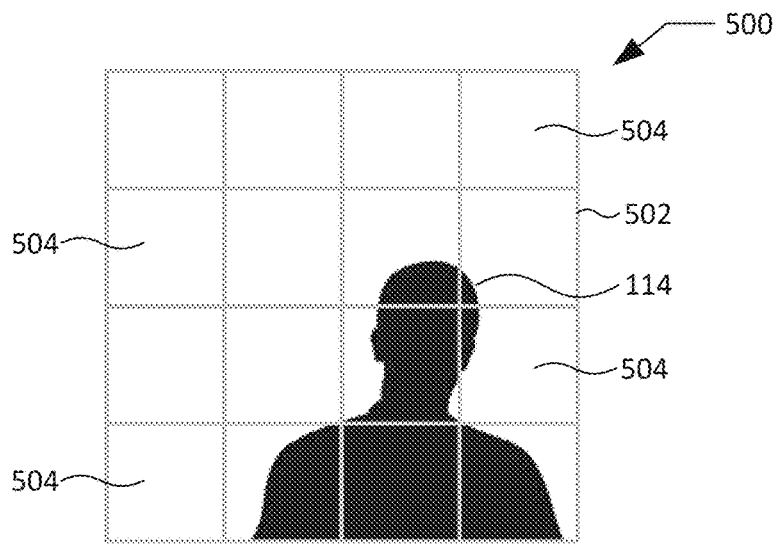
FIG. 5 illustrates a first example representation of multi-zone depth data obtained from the example depth sensor(s) of the example computing device of FIGS. 1-4 in connection with the first example scenario of FIG. 2.
Figure 6:
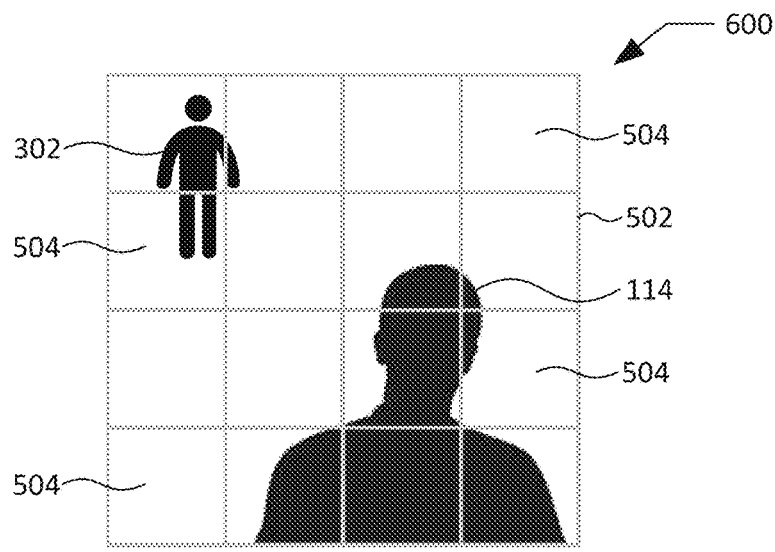
FIG. 6 illustrates a second example representation of multi-zone depth data obtained from the example depth sensor(s) of the example computing device of FIGS. 1-5 in connection with the second example scenario of FIG. 3.
Figure 7:
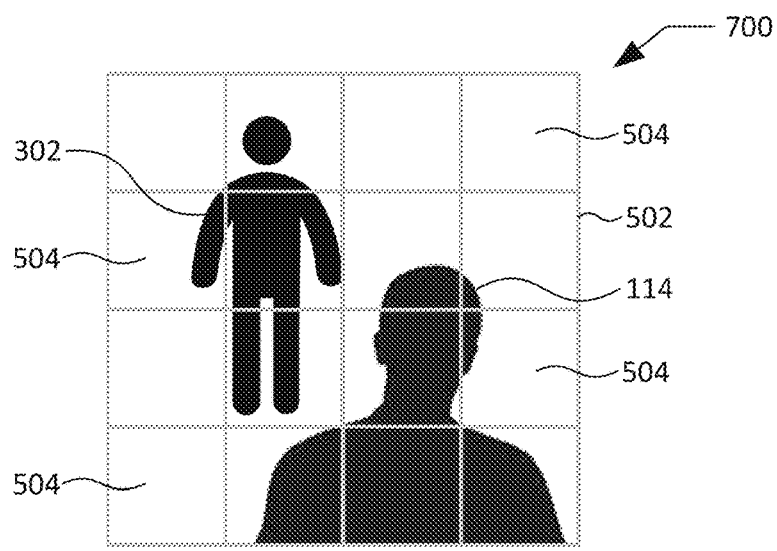
FIG. 7 illustrates a third example representation of multi-zone depth data obtained from the example depth sensor(s) of the example computing device of FIGS. 1-6 in connection with the third example scenario of FIG. 4.

FIG. 5 illustrates a first example representation 500 of multi-zone depth data obtained from the example depth sensor(s) 108 of the example computing device 102 of FIGS. 1-4 in connection with the first example scenario 200 of FIG. 2. FIG. 6 illustrates a second example representation 600 of multi-zone depth data obtained from the example depth sensor(s) 108 of the example computing device 102 of FIGS. 1-5 in connection with the second example scenario 300 of FIG. 3. FIG. 7 illustrates a third example representation 700 of multi-zone depth data obtained from the example depth sensor(s) 108 of the example computing device 102 of FIGS. 1-6 in connection with the third example scenario 400 of FIG. 4. In the illustrated examples of the first representation 500 shown in FIG. 5, the second representation 600 shown in FIG. 6, and the third representation 700 shown in FIG. 7, the multi-zone depth data is represented by an example grid 502 having example zones 504. The grid 502 of FIGS. 5-7 includes four rows, four columns, and a total of sixteen zones 504. In other examples, the grid 502 can include a different number of rows, a different number of columns, and/or a different number of zones. As shown in the examples of FIGS. 5-7, the multi-zone depth data is anonymous depth data (e.g., depth data from which the identity of an individual cannot be determined).

In the first representation 500 of FIG. 5 corresponding to the first scenario 200 of FIG. 2, the multi-zone depth data included in the zones 504 of the grid 502 indicates the presence of the end user 114 within the field of view of the depth sensor(s) 108, but does not indicate that any onlookers are present within the field of view of the depth sensor(s) 108. When evaluated by the computing device 102, the multi-zone depth data shown in the first representation 500 of FIG. 5 causes the computing device 102 to detect that no onlookers are present within the field of view of the depth sensor(s) 108. The multi-zone depth data shown in the first representation 500 of FIG. 5 additionally or alternatively causes the computing device 102 to detect that no onlookers are located within the first proximity threshold 204 defined by the lower boundary distance 206 and by the upper boundary distance 208, as shown in FIG. 2. In response to such detection(s), the computing device 102 does not invoke any security features of the display 104 of the computing device 102.

In the second representation 600 of FIG. 6 corresponding to the second scenario 300 of FIG. 3, the multi-zone depth data included in the zones 504 of the grid 502 indicates the presence of both the end user 114 and the onlooker 302 within the field of view of the depth sensor(s) 108. The multi-zone depth data further indicates that the location of the onlooker 302 is beyond the upper boundary distance 208 of the first proximity threshold 204, as shown in FIG. 3. When evaluated by the computing device 102, the multi-zone depth data shown in the second representation 600 of FIG. 6 causes the computing device 102 to detect that the onlooker 302 is present within the field of view of the depth sensor(s) 108. The multi-zone depth data shown in the second representation 600 of FIG. 6 additionally or alternatively causes the computing device 102 to detect that the onlooker 302 is not located within the first proximity threshold 204 defined by the lower boundary distance 206 and by the upper boundary distance 208, as shown in FIG. 3. In response to such detection(s), the computing device 102 does not invoke any security features of the display 104 of the computing device 102.

In the third representation 700 of FIG. 7 corresponding to the third scenario 400 of FIG. 4, the multi-zone depth data included in the zones 504 of the grid 502 indicates the presence of both the end user 114 and the onlooker 302 within the field of view of the depth sensor(s) 108. The multi-zone depth data further indicates that the location of the onlooker 302 is within the first proximity threshold 204 defined by the lower boundary distance 206 and by the upper boundary distance 208, as shown in FIG. 4. When evaluated by the computing device 102, the multi-zone depth data shown in the third representation 700 of FIG. 7 causes the computing device 102 to detect that the onlooker 302 is present within the field of view of the depth sensor(s) 108. The multi-zone depth data shown in the third representation 700 of FIG. 7 additionally or alternatively causes the computing device 102 to detect that the onlooker 302 is located within the first proximity threshold 204 defined by the lower boundary distance 206 and by the upper boundary distance 208, as shown in FIG. 4. In response to such detection(s), the computing device 102 automatically invokes one or more security feature(s) of the display 104 of the computing device 102. Invocation of the security feature(s) reduces (e.g., eliminates) the ability of the onlooker 302 to view information being presented via the display 104 of the computing device 102.

Figure 8:
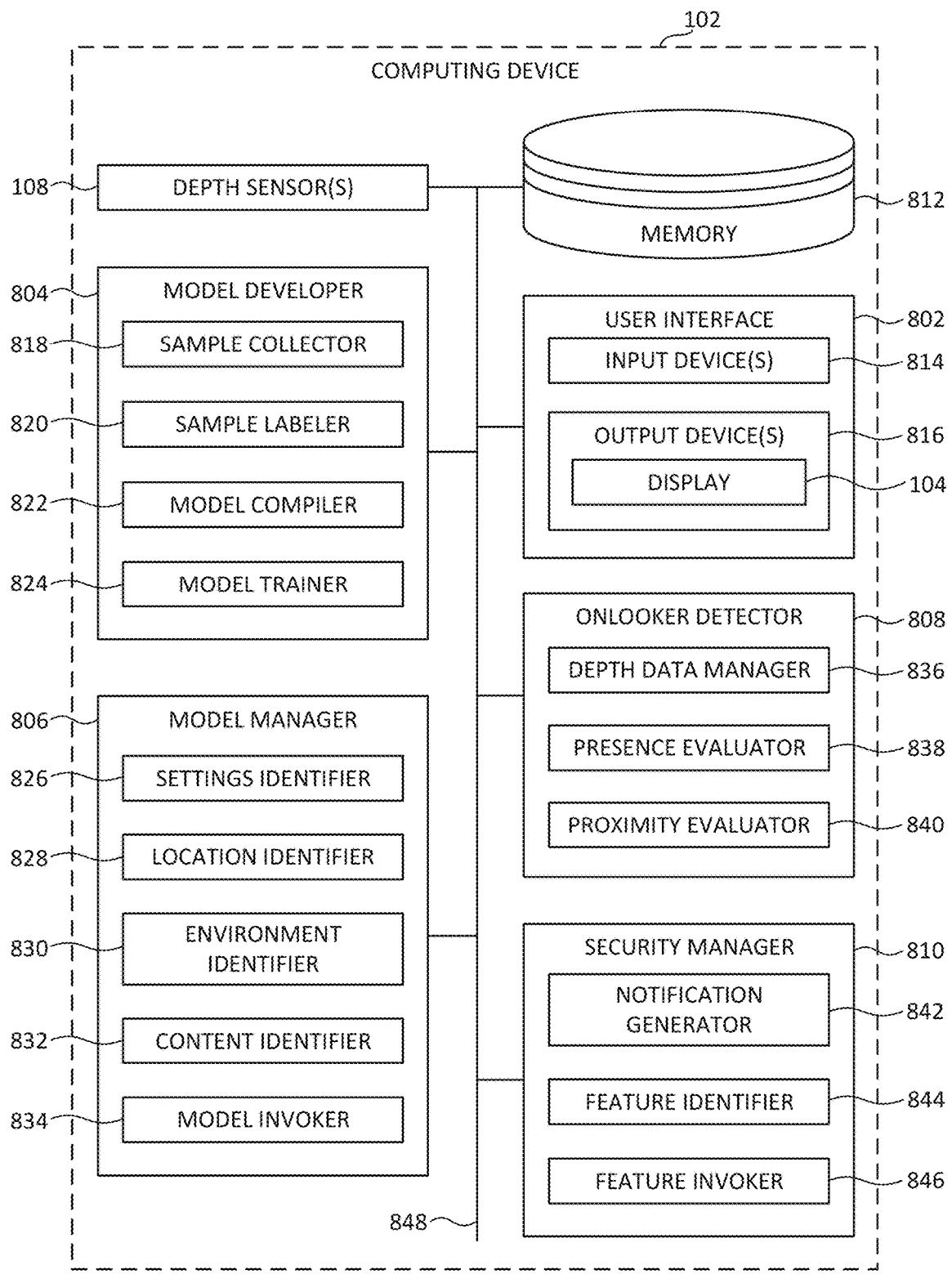
FIG. 8 is a block diagram of the example computing device of FIGS. 1-7 constructed in accordance with teachings of this disclosure.

FIG. 8 is a block diagram of the example computing device 102 of FIGS. 1-7 constructed in accordance with teachings of this disclosure. In the illustrated example of FIG. 8, the computing device 102 includes one or more example depth sensor(s) 108, an example user interface 802, an example model developer 804, and example model manager 806, an example onlooker detector 808, an example security manager 810, and an example memory 812. The example user interface 802 of FIG. 8 includes one or more example input device(s) 814 and one or more example output device(s) 816. The output device(s) 816 include an example display 104. The example model developer 804 of FIG. 8 includes an example sample collector 818, an example sample labeler 820, an example model compiler 822, and an example model trainer 824. The example model manager 806 of FIG. 8 includes an example settings identifier 826, an example location identifier 828, an example environment identifier 830, an example content identifier 832, and an example model invoker 834. The example onlooker detector 808 of FIG. 8 includes an example depth data manager 836, an example presence evaluator 838, and an example proximity evaluator 840. The example security manager 810 of FIG. 8 includes an example notification generator 842, an example feature identifier 844, and an example feature invoker 846. However, other example implementations of the computing device 102 of FIG. 8 may include fewer or additional structures.

In the illustrated example of FIG. 8, the depth sensor(s) 108, the user interface 802 (including the input device(s) 814, the output device(s) 816, and the display 104), the model developer 804 (including the sample collector 818, the sample labeler 820, the model compiler 822, and the model trainer 824), the model manager 806 (including the settings identifier 826, the location identifier 828, the environment identifier 830, the content identifier 832, and the model invoker 834), the onlooker detector 808 (including the depth data manager 836, the presence evaluator 838 and the proximity evaluator 840), the security manager 810 (including the notification generator 842, the feature identifier 844, and the feature invoker 846), and/or the memory 812 are operatively coupled (e.g., in electrical communication) via an example communication bus 848.

The example depth sensor(s) 108 of FIG. 8 sense(s), measure(s) and/or detect(s) depth data (e.g., depths, distances, ranges, etc.) of objects (e.g., humans) located within a field of view of the depth sensor(s) 108 relative to the position(s) of the depth sensor(s) 108. In some examples, the depth data sensed, measured and/or detected via the depth sensor(s) 108 is multi-zone depth data that can be represented by a grid including a plurality of zones (e.g., the grid 502 of FIGS. 5-7 including the zones 504 of FIGS. 5-7) located within the field of view of the depth sensor(s) 108. The depth sensor(s) 108 of FIG. 8 can be implemented by any number and/or any type of depth-measuring and/or range-measuring sensor(s) that is/are configured to sense, measure and/or detect depth data (e.g., multi-zone depth data) that is anonymous (e.g., depth data from which the identity of an individual cannot be determined). For example, the depth sensor(s) 108 of FIG. 8 can be implemented by any number (e.g., 1, 2, 3, etc.) of infrared sensors, RADAR sensors, LIDAR sensors, UWB sensors, ultrasonic sensors, TOF sensors, image sensors, etc. Depth data sensed, measured and/or detected by the depth sensor(s) 108 may be associated with one or more local time(s) (e.g., time stamped) at which the data was collected by the depth sensor(s) 108. Depth data sensed, measured and/or detected by the depth sensor(s) 108 may be of any quantity, type, form and/or format, and may be stored in a computer-readable storage medium such as the example memory 812 of FIG. 8 described below.

The example user interface 802 of FIG. 8 facilitates interactions and/or communications between an end user (e.g., the end user 114 of FIGS. 1-7) and the computing device 102. The user interface 802 includes one or more input device(s) 814 via which the end user may input information and/or data to the computing device 102. For example, the input device(s) 814 may include a mouse, a keyboard, a touchpad, a button, a switch, a microphone, and/or a touchscreen that enable(s) the end user to convey data and/or commands to the computing device 102 of FIG. 8. The user interface 802 of FIG. 8 also includes one or more output device(s) 816 via which the user interface 802 presents information and/or data in visual and/or audible form to the end user. For example, the output device(s) 816 may include a light emitting diode, a CRT monitor, an LCD monitor, an LED monitor, and/or a touchscreen for presenting visual information, and/or a speaker for presenting audible information. In the illustrated example of FIG. 8, the output device(s) 816 of the user interface 802 include the example display 104 of FIGS. 1-4 described above. Data and/or information that is presented and/or received via the user interface 802 may be of any quantity, type, form and/or format, and may be stored in a computer-readable storage medium such as the example memory 812 of FIG. 8 described below.

The example model developer 804 of FIG. 8 builds and/or develops an onlooker detection model based on depth data (e.g., multi-zone, anonymous depth data) obtained from the depth sensor(s) 108 of the computing device 102 of FIGS. 1-8. As mentioned above, the model developer 804 of FIG. 8 includes the sample collector 818, the sample labeler 820, the model compiler 822, and the model trainer 824 of FIG. 8, each of which is further described below. The model developer 804 of FIG. 8 may be implemented by any type(s) and/or any number(s) of semiconductor device(s) (e.g., microprocessor(s), microcontroller(s), etc.). The onlooker detection model built and/or developed by and/or at the model developer 804 may be of any type, form and/or format, and may be stored in a computer-readable storage medium such as the example memory 812 of FIG. 8 described below. Model development data generated, implemented, invoked, processed and/or executed by and/or at the model developer 804 may be of any quantity, type, form and/or format, and may be stored in a computer-readable storage medium such as the example memory 812 of FIG. 8 described below.

The example sample collector 818 of the model developer 804 of FIG. 8 collects samples of depth data (e.g., static or dynamic samples of the depth data obtained from the depth sensor(s) 108 of the computing device 102). For example, the sample collector 818 may collect multiple frames of depth data based on a predetermined sampling rate (e.g., static depth data). In such an example, each collected frame of depth data is a sample, and the sample collector 818 may collect any number of such samples. As another example, the sample collector 818 may collect multiple instances of a time series of frames based on a fixed number of frames sampled at a predetermined sampling rate and contained within an instance of a predetermined sliding time-based window (e.g., dynamic depth data). In such an example, each time series of frames included within an instance of the sliding time-based window is a sample, and the sample collector 818 may collect any number of such samples. The sample collector 818 of FIG. 8 may be implemented by any type(s) and/or any number(s) of semiconductor device(s) (e.g., microprocessor(s), microcontroller(s), etc.). Samples of depth data collected, generated and/or processed by and/or at the sample collector 818 may be of any quantity, type, form and/or format, and may be stored in a computer-readable storage medium such as the example memory 812 of FIG. 8 described below.

The example sample labeler 820 of the model developer 804 of FIG. 8 labels the samples of depth data collected by the sample collector 818 of the model developer 804. In some examples, the sample labeler 820 may evaluate each collected sample of depth data (e.g., each collected sample of static or dynamic depth data) to determine whether the depth data of the sample indicates that one or more onlooker(s) is/are present in the field of view of the depth sensor(s) 108 from which the depth data was collected. If the sample labeler 820 of FIG. 8 determines that the depth data of the sample indicates that one or more onlooker(s) is/are present in the field of view of the depth sensor(s) 108, the sample labeler 820 labels (e.g., tags, flags, or otherwise associates) the sample as an "onlooker detected" sample. If the sample labeler 820 of FIG. 8 instead determines that the depth data of the sample indicates that no onlookers are present in the field of view of the depth sensor(s) 108, the sample labeler 820 labels (e.g., tags, flags, or otherwise associates) the sample as an "onlooker not detected" sample.

In other examples, the operation of the sample labeler 820 of FIG. 8 may be more granular. For example, the sample labeler 820 may additionally or alternatively evaluate each collected sample of depth data (e.g., each collected sample of static or dynamic depth data) to determine whether the depth data of the sample indicates that one or more onlooker(s) is/are located within a proximity threshold (e.g., the first proximity threshold 204 of FIGS. 2-4) defined by a lower boundary distance from the depth sensor(s) 108 (e.g., the lower boundary distance 206 of FIGS. 2-4) and by an upper boundary distance from the depth sensor(s) 108 (e.g., the upper boundary distance 208 of FIGS. 2-4). If the sample labeler 820 of FIG. 8 determines that the depth data of the sample indicates that one or more onlooker(s) is/are present within the proximity threshold associated with the depth sensor(s) 108, the sample labeler 820 labels (e.g., tags, flags, or otherwise associates) the sample as an "onlooker detected" sample. If the sample labeler 820 of FIG. 8 instead determines that the depth data of the sample indicates that no onlookers are located within the proximity threshold associated with the depth sensor(s) 108, the sample labeler 820 labels (e.g., tags, flags, or otherwise associates) the sample as an "onlooker not detected" sample.

In some examples, the sample labeler 820 of FIG. 8 may operate in connection with one or more controlled, known and/or prearranged environments. For example, the sample labeler 820 may collect a first depth data log including samples of depth data in which at least one onlooker is known to be present (e.g., due to an onlooker intentionally being located within the field of view of the depth sensor(s) 108 and/or within the proximity threshold associated therewith). The sample labeler 820 may accordingly label (e.g., tag, flag, or otherwise associate) the samples of the first depth data log as "onlooker detected" samples. The sample labeler 820 may additionally collect a second depth data log including samples of depth data in which it is known that no onlookers are present (e.g., due to any onlookers intentionally being located outside of the field of view of the depth sensor(s) 108 and/or outside of the proximity threshold associated therewith). The sample labeler 820 may accordingly label (e.g., tag, flag, or otherwise associate) the samples of the second depth data log as "onlooker not detected" samples.

In some examples, the sample labeler 820 of FIG. 8 may operate in connection with a camera-based application. For example, the sample labeler 820 may enable a camera-based application to detect a face of an onlooker as the onlooker enters the field of view of the depth sensor(s) 108 and/or an associated field of view of a camera. If the camera-based application detects the face of the onlooker, the sample labeler 820 labels (e.g., tags, flags, or otherwise associates) the collected sample as an "onlooker detected" sample. If the camera-based application does not detect the face of the onlooker, the sample labeler 820 labels (e.g., tags, flags, or otherwise associates) the collected sample as an "onlooker not detected" sample. The sample labeler 820 of FIG. 8 may be implemented by any type(s) and/or any number(s) of semiconductor device(s) (e.g., microprocessor(s), microcontroller(s), etc.). Labeled samples of depth data generated and/or processed by and/or at the sample labeler 820 may be of any quantity, type, form and/or format, and may be stored in a computer-readable storage medium such as the example memory 812 of FIG. 8 described below.

The example model compiler 822 of the example model developer 804 of FIG. 8 compiles an onlooker detection model to be trained by the model trainer 824 of FIG. 8, and/or to be invoke by the model invoker 834 of FIG. 8. For example, the model compiler 822 may transform high-level source code associated with an onlooker detection model into a low level object code (e.g., binary code) in machine language which can be understood by one or more processor(s) of the computing device 102. The model compiler 822 of FIG. 8 may be implemented by any type(s) and/or any number(s) of semiconductor device(s) (e.g., microprocessor(s), microcontroller(s), etc.). The compiled onlooker detection model compiled by and/or at the model compiler 822 may be of any type, form and/or format, and may be stored in a computer-readable storage medium such as the example memory 812 of FIG. 8 described below.

The example model trainer 824 of the example model developer 804 of FIG. 8 trains an onlooker detection model (e.g., the onlooker detection model compiled by the model compiler 822 of FIG. 8) based on the samples of depth data labeled by the sample labeler 820 of FIG. 8. In some examples, the model trainer 824 trains an onlooker detection model implemented as a convolutional neural network (CNN) model, a support vector machine (SVM) model, a k-nearest neighbor (KNN) model, or a convolutional long short-term memory (ConvLSTM) model. In some examples, the model trainer 824 of FIG. 8 processes at least ten thousand labeled samples of depth data in connection with training the onlooker detection model. The model trainer 824 of FIG. 8 may also reduce the dimensionality of the onlooker detection model in connection with and/or subsequent to the onlooker detection model being trained.

In some examples, the model trainer 824 of FIG. 8 trains the onlooker detection model with labeled samples of static depth data. The model trainer 824 may process the samples of static depth data on a sample-by-sample (e.g., frame-by-frame) basis, and may train the onlooker detection model based on the specific label (e.g., "onlooker detected" versus "onlooker not detected") associated with each sample of static depth data. In other examples, the model trainer 824 trains the onlooker detection model with labeled samples of dynamic depth data. The model trainer 824 may process the samples of dynamic depth data on a sample-by-sample (e.g., window-by-window) basis, and may train the onlooker detection model based on the specific label (e.g., "onlooker detected" versus "onlooker not detected") associated with each sample of dynamic depth data. The model trainer 824 of FIG. 8 may be implemented by any type(s) and/or any number(s) of semiconductor device(s) (e.g., microprocessor(s), microcontroller(s), etc.). The onlooker detection model trained by and/or at the model trainer 824, and/or to be trained by and/or at the model trainer 824, may be of any type, form and/or format, and may be stored in a computer-readable storage medium such as the example memory 812 of FIG. 8 described below.

The example model manager 806 of FIG. 8 determines whether to invoke the onlooker detection model developed by the model developer 804 of FIG. 8 based on one or more contextual parameter(s). In some examples, the contextual parameter(s) may include the location at which the computing device 102 of FIGS. 1-8 is being used, the environment type in which the computing device 102 is being used, and/or the content type associated with the information being presented on the display 104 of the computing device 102. In some examples, the specific contextual parameter(s) to be considered by the model manager 806 of FIG. 8 may be indicated by one or more setting(s) of the computing device 102, and/or by one or more end user input(s) received via the user interface 802 of FIG. 8 from an end user of the computing device 102. As mentioned above, the model manager 806 of FIG. 8 includes the settings identifier 826, the location identifier 828, the environment identifier 830, the content identifier 832, and the model invoker 834 of FIG. 8, each of which is further described below. The model manager 806 of FIG. 8 may be implemented by any type(s) and/or any number(s) of semiconductor device(s) (e.g., microprocessor(s), microcontroller(s), etc.). Settings, end user inputs, contextual parameters and/or model invocation data generated, implemented, invoked, processed and/or executed by and/or at the model manager 806 may be of any quantity, type, form and/or format, and may be stored in a computer-readable storage medium such as the example memory 812 of FIG. 8 described below.

The example settings identifier 826 of FIG. 8 identifies and/or determines which, if any, contextual parameters are to be considered in the course of the model manager 806 of FIG. 8 determining whether to invoke the onlooker detector model. In some examples, the settings identifier 826 identifies and/or determines the contextual parameter(s) to be considered by the model manager 806 based on one or more setting(s) (e.g., requirement(s), preference(s), etc.) of the computing device 102, and/or based on one or more input(s) received via the user interface 802 of FIG. 8 from an end user of the computing device 102. For example, the settings identifier 826 of FIG. 8 may identify and/or determine (e.g., based on a setting and/or an end user input) that the model manager 806 of FIG. 8 is to consider the location at which the computing device 102 of FIGS. 1-8 is being used. The settings identifier 826 of FIG. 8 may additionally or alternatively determine that the model manager 806 of FIG. 8 is to consider the environment type in which the computing device 102 of FIGS. 1-8 is being used. The settings identifier 826 of FIG. 8 may additionally or alternatively determine that the model manager 806 of FIG. 8 is to consider type associated with the information being presented on the display 104 of the computing device 102.

In some examples, the settings identifier 826 of FIG. 8 may alternatively determine that the model manager 806 of FIG. 8 is to invoke the onlooker detection model without considering any contextual parameters. For example, one or more setting(s) of the computing device 102 may indicate that the model manager 806 is to invoke the onlooker detection model (e.g., by default) without consideration of any contextual parameters. In other examples, the settings identifier 826 may alternatively determine that the model manager 806 is to invoke the onlooker detection model based on one or more end user input(s) (e.g., one or more command(s) and/or instruction(s)) received via the input device(s) 814 of the user interface 802 of FIG. 8. The settings identifier 826 of FIG. 8 may be implemented by any type(s) and/or any number(s) of semiconductor device(s) (e.g., microprocessor(s), microcontroller(s), etc.). Settings, end user inputs, and/or contextual parameters identified, determined and/or processed by and/or at the settings identifier 826 may be of any quantity, type, form and/or format, and may be stored in a computer-readable storage medium such as the example memory 812 of FIG. 8 described below.

The example location identifier 828 of the example model manager 806 of FIG. 8 identifies and/or determines the location of the computing device 102 of FIGS. 1-8. In some examples, the location identifier 828 identifies and/or determines the location of the computing device 102 based on location data collected by a GPS receiver of the computing device 102. In other examples, the location identifier 828 identifies and/or determines the location of the computing device 102 based on location data determined (e.g., via triangulation or via a network connection) by radio hardware (e.g., a transmitter, a receiver, a transceiver, etc.) of the computing device 102. In still other examples, the location identifier 828 identifies and/or determines the location of the computing device 102 based on location data derived from an IP address associated with the computing device 102. In still other examples, the location identifier 828 identifies and/or determines the location of the computing device 102 based on location data input by an end user via the input device(s) 814 of the user interface 802 of FIG. 8. The location identifier 828 of FIG. 8 may be implemented by any type(s) and/or any number(s) of semiconductor device(s) (e.g., microprocessor(s), microcontroller(s), etc.). Location data identified, determined and/or processed by and/or at the location identifier 828 may be of any quantity, type, form and/or format, and may be stored in a computer-readable storage medium such as the example memory 812 of FIG. 8 described below.

The example model manager 806 of FIG. 8 determines whether the location identified by the location identifier 828 of FIG. 8 indicates that the onlooker detection model should be invoked and/or executed. In some examples, the location identified by the location identifier 828 indicates that the onlooker detection model should be invoked and/or executed when the identified location is more than a threshold distance away from a predetermined secure location. If the model manager 806 determines that the location identified by the location identifier 828 indicates that the onlooker detection model should be invoked and/or executed, the model manager 806 commands and/or instructs the model invoker 834 to invoke and/or execute the onlooker detection model.

The example environment identifier 830 of the example model manager 806 of FIG. 8 identifies and/or determines the environment type in which the computing device 102 of FIGS. 1-8 is being used. In some examples, the environment identifier 830 identifies and/or determines the environment type as being either a private (e.g., secure) environment or a public (e.g., unsecure) environment. In some examples, the environment identifier 830 identifies and/or determines the environment type based on the location data identified and/or determined by the location identifier 828 of FIG. 8. For example, the environment identifier 830 may identify and/or determine that the location data corresponds to a private environment (e.g., an end user's workplace, an end-user's home, etc.), or may instead identify and/or determine that the location data corresponds to a public environment (e.g., a library, a coffee shop, an airport, etc.). In other examples, the environment identifier 830 identifies and/or determines the environment type in which the computing device 102 is being used based on environment type data input by an end user via the input device(s) 814 of the user interface 802 of FIG. 8. The environment identifier 830 of FIG. 8 may be implemented by any type(s) and/or any number(s) of semiconductor device(s) (e.g., microprocessor(s), microcontroller(s), etc.). Environment type data identified, determined and/or processed by the environment identifier 830 may be of any quantity, type, form and/or format, and may be stored in a computer-readable storage medium such as the example memory 812 of FIG. 8 described below.

The example model manager 806 of FIG. 8 determines whether the environment type identified by the environment identifier 830 of FIG. 8 indicates that the onlooker detection model should be invoked and/or executed. In some examples, the environment type identified by the environment identifier 830 indicates that the onlooker detection model should be invoked and/or executed when the identified environment type is and/or corresponds to a public (e.g., unsecure) environment. If the model manager 806 determines that the environment type identified by the environment identifier 830 indicates that the onlooker detection model should be invoked and/or executed, the model manager 806 commands and/or instructs the model invoker 834 to invoke and/or execute the onlooker detection model.

The example content identifier 832 of the example model manager 806 of FIG. 8 identifies and/or determines the content type associated with the information 116 being presented on the display 104 of the computing device 102 of FIGS. 1-8. In some examples, the content identifier 832 identifies and/or determines the content type as being either confidential content or non-confidential content. In some examples, the content identifier 832 identifies and/or determines the content type based on metadata associated with the information 116. For example, the content identifier 832 may identify and/or determine that metadata associated with the information 116 indicates (e.g., via a tag, flag, label, etc.) that the information 116 is confidential content, or may instead identify and/or determine that the metadata indicates (e.g., via a tag, flag, label, etc.) that the information 116 is non-confidential content. In other examples, the content identifier 832 identifies and/or determines the content type associated with the information 116 being presented on the display 104 of the computing device 102 based on content type data input by an end user via the input device(s) 814 of the user interface 802 of FIG. 8. The content identifier 832 of FIG. 8 may be implemented by any type(s) and/or any number(s) of semiconductor device(s) (e.g., microprocessor(s), microcontroller(s), etc.). Content type data identified, determined and/or processed by and/or at the content identifier 832 may be of any quantity, type, form and/or format, and may be stored in a computer-readable storage medium such as the example memory 812 of FIG. 8 described below.

The example model manager 806 of FIG. 8 determines whether the content type identified by the content identifier 832 of FIG. 8 indicates that the onlooker detection model should be invoked and/or executed. In some examples, the content type identified by the content identifier 832 indicates that the onlooker detection model should be invoked and/or executed when the identified content type is and/or corresponds to confidential content. If the model manager 806 determines that the content type identified by the content identifier 832 indicates that the onlooker detection model should be invoked and/or executed, the model manager 806 commands and/or instructs the model invoker 834 to invoke and/or execute the onlooker detection model.

The example model invoker 834 of the example model manager 806 of FIG. 8 invokes and/or executes the onlooker detection model at and/or on the computing device 102 of FIGS. 1-8. For example, the model invoker 834 may invoke and/or execute the onlooker detection model compiled by the model compiler 822 and/or, more generally, developed by the model developer 804 of FIG. 8. In some examples, the model invoker 834 invokes and/or executes the onlooker detection model based on one or more command(s) and/or instruction(s) received from the model manager 806 of FIG. 8. In other examples, the model invoker 834 invokes and/or executes the onlooker detection model based on one or more command(s) and/or instruction(s) received from the user interface 802 of FIG. 8 (e.g., in response to one or more end user input(s) provided to the input device(s) 814 of the user interface 802). The model invoker 834 of FIG. 8 may be implemented by any type(s) and/or any number(s) of semiconductor device(s) (e.g., microprocessor(s), microcontroller(s), etc.). The onlooker detection model invoked and/or executed by the model invoker 834 may be of any type, form and/or format, and may be stored in a computer-readable storage medium such as the example memory 812 of FIG. 8 described below. Model invocation data generated, implemented, invoked, processed and/or executed by and/or at the model invoker 834 may be of any quantity, type, form and/or format, and may be stored in a computer-readable storage medium such as the example memory 812 of FIG. 8 described below.

The example onlooker detector 808 of FIG. 8 detects one or more onlooker(s) via the onlooker detection model based on depth data obtained from the depth sensor(s) 108 of the computing device 102 of FIGS. 1-8. As mentioned above, the onlooker detector 808 of FIG. 8 includes the depth data manager 836, the presence evaluator 838, and the proximity evaluator 840 of FIG. 8, each of which is further described below. The onlooker detector 808 of FIG. 8 may be implemented by any type(s) and/or any number(s) of semiconductor device(s) (e.g., microprocessor(s), microcontroller(s), etc.). Onlooker detection data generated, implemented, invoked, processed and/or executed by and/or at the onlooker detector 808 may be of any quantity, type, form and/or format, and may be stored in a computer-readable storage medium such as the example memory 812 of FIG. 8 described below.

The example depth data manager 836 of the example onlooker detector 808 of FIG. 8 manages the process of collecting depth data (e.g., static or dynamic depth data) from the depth sensor(s) 108 of the computing device 102, and further manages the process of loading the collected depth data into the onlooker detection model for further processing. For example, the depth data manager 836 may collect depth data sensed, measured and/or detected by the depth sensor(s) 108 of FIGS. 1-8. In some examples, the depth data manager 836 collects one or more frame(s) of depth data based on a predetermined sampling rate (e.g., static depth data). In other examples, the depth data manager 836 may collect one or more instance(s) of a time series of frames based on a fixed number of frames sampled at a predetermined sampling rate and contained within an instance of a predetermined sliding time-based window (e.g., dynamic depth data). In some examples, the depth data manager 836 collectes the depth data and subsequently loads the collected depth data into the onlooker detection model in response to the model invoker 834 of the model manager 806 of FIG. 8 invoking and/or executing the onlooker detection model. The depth data manager 836 of FIG. 8 may be implemented by any type(s) and/or any number(s) of semiconductor device(s) (e.g., microprocessor(s), microcontroller(s), etc.). Depth data collected, loaded and/or processed by and/or at the depth data manager 836 may be of any quantity, type, form and/or format, and may be stored in a computer-readable storage medium such as the example memory 812 of FIG. 8 described below.

The example presence evaluator 838 of the example onlooker detector 808 of FIG. 8 detects and/or determines, based on the loaded depth data, whether the onlooker detection model indicates the presence of one or more onlooker(s) in the field of view of the depth sensor(s) 108 of the computing device 102 of FIGS. 1-8. For example, the presence evaluator 838 may detect and/or determine, based on the depth data loaded into the onlooker detection model by the depth data manager 836 of FIG. 8, that the onlooker detection model indicates the presence of an onlooker (e.g., the onlooker 302 of FIGS. 3, 4, 6 and 7) within the field of view of the depth sensor(s) 108 of the computing device 102 of FIGS. 1-8. The presence evaluator 838 of FIG. 8 may be implemented by any type(s) and/or any number(s) of semiconductor device(s) (e.g., microprocessor(s), microcontroller(s), etc.). Onlooker presence data evaluated, detected, generated and/or processed by and/or at the presence evaluator 838 may be of any quantity, type, form and/or format, and may be stored in a computer-readable storage medium such as the example memory 812 of FIG. 8 described below.

The example proximity evaluator 840 of the example onlooker detector 808 of FIG. 8 detects and/or determines, based on the loaded depth data, whether the onlooker detection model indicates that one or more onlooker(s) is/are located within a proximity threshold of the depth sensor(s) 108 of the computing device 102 of FIGS. 1-8. For example, the proximity evaluator 840 may detect and/or determine, based on the depth data loaded into the onlooker detection model, that the onlooker detection model indicates an onlooker (e.g., the onlooker 302 of FIGS. 3, 4, 6 and 7) is/are located within a proximity threshold defined by one or more boundary distance(s) (e.g., the first proximity threshold 204 defined by the lower boundary distance 206 and the upper boundary distance 208 of FIGS. 2-4) from the depth sensor(s) 108 of the computing device 102 of FIGS. 1-8. The proximity evaluator 840 of FIG. 8 may be implemented by any type(s) and/or any number(s) of semiconductor device(s) (e.g., microprocessor(s), microcontroller(s), etc.). Onlooker proximity data evaluated, detected, generated and/or processed by and/or at the proximity evaluator 840 may be of any quantity, type, form and/or format, and may be stored in a computer-readable storage medium such as the example memory 812 of FIG. 8 described below.

The example security manager 810 of FIG. 8 determines whether to invoke one or more security feature(s) of the display 104 of the computing device 102 of FIGS. 1-8. In some examples, the security manager 810 may determine that the security feature(s) is/are to be invoked in response to the onlooker detector 808 of FIG. 8 detecting that one or more onlooker(s) is/are present within the field of view of the depth sensor(s) 108 of the computing device 102 of FIGS. 1-8. In other examples, the security manager 810 may additionally or alternatively determine that the security feature(s) is/are to be invoked in response to the onlooker detector 808 of FIG. 8 detecting that one or more onlooker(s) is/are located within a proximity threshold of the depth sensor(s) 108 of the computing device 102 of FIGS. 1-8. As mentioned above, the security manager 810 of FIG. 8 includes the notification generator 842, the feature identifier 844, and the feature invoker 846 of FIG. 8, each of which is further described below. The security manager 810 of FIG. 8 may be implemented by any type(s) and/or any number(s) of semiconductor device(s) (e.g., microprocessor(s), microcontroller(s), etc.). Notifications, security features and/or security feature invocation data generated, implemented, invoked, processed and/or executed by and/or at the security manager 810 may be of any quantity, type, form and/or format, and may be stored in a computer-readable storage medium such as the example memory 812 of FIG. 8 described below.

The example notification generator 842 of the security manager 810 of FIG. 8 generates one or more notification(s) (e.g., one or more textual, graphical and/or audible notification(s)) to be presented via the display 104 and/or via the output device(s) 816 of the user interface 802 of FIG. 8. In some examples, the notification(s) indicate to and/or notify the end user 114 that one or more onlooker(s) has/have been detected by the onlooker detector 808 of FIG. 8. In some examples, the notification(s) additionally or alternatively indicate to and/or notify the end user 114 that one or more security feature(s) of the display 104 is/are being invoked or has/have been invoked by the feature invoker 846 and/or, more generally, by the security manager 810 of FIG. 8. The notification generator 842 of FIG. 8 may be implemented by any type(s) and/or any number(s) of semiconductor device(s) (e.g., microprocessor(s), microcontroller(s), etc.). Notification data generated and/or processed by the notification generator 842 may be of any quantity, type, form and/or format, and may be stored in a computer-readable storage medium such as the example memory 812 of FIG. 8 described below.

The example feature identifier 844 of the example security manager 810 of FIG. 8 identifies and/or determines one or more security feature(s) of the display 104 to be invoked. In some examples, the feature identifier 844 identifies and/or determines the security feature(s) based on one or more setting(s) (e.g., requirement(s), preference(s), etc.) of the computing device 102, and/or based on one or more input(s) received via the user interface 802 of FIG. 8 from an end user of the computing device 102. The feature identifier 844 of FIG. 8 may be implemented by any type(s) and/or any number(s) of semiconductor device(s) (e.g., microprocessor(s), microcontroller(s), etc.). Security feature data identified, determined and/or processed by the feature identifier 844 may be of any quantity, type, form and/or format, and may be stored in a computer-readable storage medium such as the example memory 812 of FIG. 8 described below.

In response to the security manager 810 of FIG. 8 determining that the onlooker detector 808 of FIG. 8 has detected one or more onlooker(s), the security manager 810 commands and/or instructs the example feature invoker 846 of FIG. 8 to invoke the security feature(s) identified by the feature identifier 844 of FIG. 8. The security feature(s) identified by the feature identifier 844 of FIG. 8 can be any quantity, type, format and/or combination of feature(s) that facilitate(s) reducing the ability of an onlooker to view information (e.g., the information 116 of FIG. 1) being presented via the display 104 of the computing device 102 of FIGS. 1-8. For example, the security feature(s) can include reducing the size (e.g., the font size, the image size, etc.) of the information 116 as presented on the screen 110 of the display 104 relative to the size at which the information 116 would otherwise be presented on the screen 110 of the display 104 in the absence of a detected onlooker. The security feature(s) can additionally or alternatively include narrowing the viewable width of the information 116 as presented on the screen 110 of the display 104 relative to the viewable width at which the information 116 would otherwise be presented on the screen 110 of the display 104 in the absence of a detected onlooker. The security feature(s) can additionally or alternatively include blurring (e.g., obscuring, filtering, blacking out, etc.) the information 116 as presented on the screen 110 of the display relative to the clarity with which the information 116 would otherwise be presented on the screen 110 of the display 104 in the absence of a detected onlooker. The security feature(s) can additionally or alternatively include decreasing the brightness of the backlighting projected onto the screen 110 of the display 104 relative to the brightness at which the backlighting would otherwise be projected onto the screen 110 of the display 104 in the absence of a detected onlooker. The security feature(s) can additionally or alternatively include redirecting and/or refocusing the backlighting projected onto the screen 110 of the display 104 relative to direction and/or the focus with which the backlighting would otherwise be projected onto the screen 110 of the display 104 in the absence of a detected onlooker.

The example feature invoker 846 of the example security manager 810 of FIG. 8 invokes and/or executes the security feature(s) of the display 104. For example, the feature invoker 846 may invoke and/or execute the security feature(s) identified and/or determined by the feature identifier 844 of FIG. 8. In some examples, the feature invoker 846 invokes and/or executes the security feature(s) based on one or more command(s) and/or instruction(s) received from the security manager 810 of FIG. 8. The feature invoker 846 of FIG. 8 may be implemented by any type(s) and/or any number(s) of semiconductor device(s) (e.g., microprocessor(s), microcontroller(s), etc.). The security feature(s) invoked and/or executed by the feature invoker 846 may be of any type, form and/or format, and may be stored in a computer-readable storage medium such as the example memory 812 of FIG. 8 described below. Security feature invocation data generated, implemented, invoked, processed and/or executed by and/or at the feature invoker 846 may be of any quantity, type, form and/or format, and may be stored in a computer-readable storage medium such as the example memory 812 of FIG. 8 described below.

The example memory 812 of FIG. 8 may be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 812 may be stored in any file and/or data structure format, organization scheme, and/or arrangement.

In some examples, the memory 812 stores depth data sensed, measured and/or detected by the depth sensor(s) 108 of FIGS. 1-8. In some examples, the memory 812 stores data and/or information presented and/or received via the user interface 802 of FIG. 8. In some examples, the memory 812 stores an onlooker detection model built and/or developed by and/or at the model developer 804 of FIG. 4. In some examples, the memory 812 stores model development data generated, implemented, invoked, processed and/or executed by and/or at the model developer 804 of FIG. 4. In some examples, the memory 812 stores samples of depth data collected, generated and/or processed by and/or at the sample collector 818 of FIG. 8. In some examples, the memory 812 stores labeled samples of depth data generated and/or processed by and/or at the sample labeler 820 of FIG. 8. In some examples, the memory 812 stores a compiled onlooker detection model compiled by and/or at the model compiler 822 of FIG. 8. In some examples, the memory 812 stores a trained onlooker detection model trained by and/or at the model trainer 824 of FIG. 8.

In some examples, the memory 812 stores settings, end user inputs, contextual parameters and/or model invocation data generated, implemented, invoked, processed and/or executed by and/or at the model manager 806 of FIG. 8. In some examples, the memory 812 stores settings, end user inputs, and/or contextual parameters identified, determined and/or processed by and/or at the settings identifier 826 of FIG. 8. In some examples, the memory 812 stores location data identified, determined and/or processed by and/or at the location identifier 828 of FIG. 8. In some examples, the memory 812 stores environment type data identified, determined and/or processed by and/or at the environment identifier 830 of FIG. 8. In some examples, the memory 812 stores content type data identified, determined and/or processed by and/or at the content identifier 832 of FIG. 8. In some examples, the memory 812 stores an onlooker detection model invoked and/or executed by the model invoker 834 of FIG. 8. In some examples, the memory 812 stores model invocation data generated, implemented, invoked, processed and/or executed by and/or at the model invoker 834 of FIG. 8.

In some examples, the memory 812 stores onlooker detection data generated, implemented, invoked, processed and/or executed by and/or at the onlooker detector 808 of FIG. 8. In some examples, the memory 812 stores depth data collected, loaded and/or processed by and/or at the depth data manager 836 of FIG. 8. In some examples, the memory 812 stores onlooker presence data evaluated, detected, generated and/or processed by and/or at the presence evaluator 838 of FIG. 8. In some examples, the memory 812 stores onlooker proximity data evaluated, detected, generated and/or processed by and/or at the proximity evaluator 840 of FIG. 8.

In some examples, the memory 812 stores notifications, security features and/or security feature invocation data generated, implemented, invoked, processed and/or executed by and/or at the security manager 810 of FIG. 8. In some examples, the memory 812 stores notification data generated and/or processed by the notification generator 842 of FIG. 8. In some examples, the memory 812 stores security feature data identified, determined and/or processed by the feature identifier 844 of FIG. 8. In some examples, the memory 812 stores security feature invocation data generated, implemented, invoked, processed and/or executed by and/or at the feature invoker 846 of FIG. 8.

The memory 812 of FIG. 8 is accessible to the depth sensor(s) 108, the user interface 802 (including the input device(s) 814, the output device(s) 816, and the display 104), the model developer 804 (including the sample collector 818, the sample labeler 820, the model compiler 822, and the model trainer 824), the model manager 806 (including the settings identifier 826, the location identifier 828, the environment identifier 830, the content identifier 832, and the model invoker 834), the onlooker detector 808 (including the depth data manager 836, the presence evaluator 838, and the proximity evaluator 840), and/or the security manager 810 (including the notification generator 842, the feature identifier 844, and the feature invoker 846) of FIG. 8, and/or, more generally, to the computing device 102 of FIGS. 1-8.

The display 104 of FIGS. 1-8 described above is a means for presenting information. The depth sensor(s) 108 of FIGS. 1-8 described above is/are a means for sensing, measuring and/or detecting depth data (e.g., multi-zone, anonymous depth data). The user interface 802 of FIG. 8 described above is a means for communicating information between the computing device 102 of FIGS. 1-8 and an end user of the computing device 102. The model developer 804 of FIG. 8 described above is a means for developing an onlooker detection model based on depth data obtained from the depth sensor(s) 108 of FIGS. 1-8. The model manager 806 of FIG. 8 described above is a means for determining whether to invoke the onlooker detection model developed by the model developer 804 of FIG. 8. The onlooker detector 808 of FIG. 8 described above is a means for detecting one or more onlooker(s) via the onlooker detection model based on depth data obtained from the depth sensor(s) 108 of FIGS. 1-8. The security manager 810 of FIG. 8 described above is a means for determining whether to invoke one or more security feature(s) of the display 104 of the computing device 102 of FIGS. 1-8. The memory 812 of FIG. 8 described above is a means for storing data and/or information on and/or at the computing device 102 of FIGS. 1-8.

The input device(s) 814 of FIG. 8 described above is/are a means for inputting information and/or data from an end user to the computing device 102 of FIGS. 1-8. The output device(s) 816 of FIG. 8 described above is/are a means for presenting information and/or data in visual and/or audible form to an end user of the computing device 102 of FIGS. 1-8.

The sample collector 818 of FIG. 8 described above is a means for collecting samples of depth data obtained from the depth sensor(s) 108 of FIGS. 1-8. The sample labeler 820 of FIG. 8 described above is a means for labeling samples of depth data collected by the sample collector 818 of FIG. 8. The model compiler 822 of FIG. 8 described above is a means for compiling an onlooker detection model. The model trainer 824 of FIG. 8 described above is a means for training an onlooker detection model based on samples of depth data labeled by the sample labeler 820 of FIG. 8.

The settings identifier 826 of FIG. 8 described above is a means for identifying and/or determining which, if, any, contextual parameters are to be considered in the course of the model manager 806 of FIG. 8 determining whether to invoke the onlooker detector model. The location identifier 828 of FIG. 8 described above is a means for identifying and/or determining the location of the computing device 102 of FIGS. 1-8. The environment identifier 830 of FIG. 8 described above is a means for identifying and/or determining the environment type in which the computing device 102 of FIGS. 1-8 is being used. The content identifier 832 of FIG. 8 described above is a means for identifying and/or determining the content type associated with the information 116 being presented on the display 104 of the computing device 102 of FIGS. 1-8. The model invoker 834 of FIG. 8 described above is a means for invoking and/or executing the onlooker detection model at and/or on the computing device 102 of FIGS. 1-8.

The depth data manager 836 of FIG. 8 described above is a means for collecting depth data from the depth sensor(s)

108 of FIGS. 1-8, and for loading the collected depth data into the onlooker detection model. The presence evaluator 838 of FIG. 8 is a means for detecting and/or determining, based on the loaded depth data, whether the onlooker detection model indicates the presence of one or more onlooker(s) in the field of view of the depth sensor(s) 108 of the computing device 102 of FIGS. 1-8. The proximity evaluator 840 of FIG. 8 is a means for detecting and/or determining, based on the loaded depth data, whether the onlooker detection model indicates that one or more onlooker(s) is/are located within a proximity threshold of the depth sensor(s) 108 of the computing device 102 of FIGS. 1-8.

The notification generator 842 of FIG. 8 is a means for generating one or more notification(s) to be presented via the display 104 and/or via the output device(s) 816 of the user interface 802 of FIG. 8. The feature identifier 844 of FIG. 8 is a means for identifying and/or determining one or more security feature(s) of the display 104 to be invoked. The feature invoker 846 of FIG. 8 is a means for invoking and/or executing the security feature(s) of the display 104 identified by the feature identifier 844 of FIG. 8.

While an example manner of implementing the computing device 102 is illustrated in FIGS. 1-8, one or more of the elements, processes and/or devices illustrated in FIGS. 1-8 may be combined, divided, re-arranged, omitted, eliminated and/or implemented in any other way. Further, the example display 104, the example depth sensor(s) 108, the example user interface 802, the example model developer 804, the example model manager 806, the example onlooker detector 808, the example security manager 810, the example memory 812, the example input device(s) 814, the example output device(s) 816, the example sample collector 818, the example sample labeler 820, the example model compiler 822, the example model trainer 824, the example settings identifier 826, the example location identifier 828, the example environment identifier 830, the example content identifier 832, the example model invoker 834, the example depth data manager 836, the example presence evaluator 838, the example proximity evaluator 840, the example notification generator 842, the example feature identifier 844, the example feature invoker 846 and/or, more generally, the example computing device 102 of FIGS. 1-8 may be implemented by hardware, software, firmware and/or any combination of hardware, software and/or firmware. Thus, for example, any of the example display 104, the example depth sensor(s) 108, the example user interface 802, the example model developer 804, the example model manager 806, the example onlooker detector 808, the example security manager 810, the example memory 812, the example input device(s) 814, the example output device(s) 816, the example sample collector 818, the example sample labeler 820, the example model compiler 822, the example model trainer 824, the example settings identifier 826, the example location identifier 828, the example environment identifier 830, the example content identifier 832, the example model invoker 834, the example depth data manager 836, the example presence evaluator 838, the example proximity evaluator 840, the example notification generator 842, the example feature identifier 844, the example feature invoker 846 and/or, more generally, the example computing device 102 of FIGS. 1-8 could be implemented by one or more analog or digital circuit(s), logic circuit(s), programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example display 104, the example depth sensor(s) 108, the example user interface 802, the example model developer 804, the example model manager 806, the example onlooker detector 808, the example security manager 810, the example memory 812, the example input device(s) 814, the example output device(s) 816, the example sample collector 818, the example sample labeler 820, the example model compiler 822, the example model trainer 824, the example settings identifier 826, the example location identifier 828, the example environment identifier 830, the example content identifier 832, the example model invoker 834, the example depth data manager 836, the example presence evaluator 838, the example proximity evaluator 840, the example notification generator 842, the example feature identifier 844, and/or the example feature invoker 846 of FIGS. 1-8 is/are hereby expressly defined to include a non-transitory computer readable storage device or storage disk such as a memory, a digital versatile disk (DVD), a compact disk (CD), a Blu-ray disk, etc. including the software and/or firmware. Further still, the example display 104, the example depth sensor(s) 108, the example user interface 802, the example model developer 804, the example model manager 806, the example onlooker detector 808, the example security manager 810, the example memory 812, the example input device(s) 814, the example output device(s) 816, the example sample collector 818, the example sample labeler 820, the example model compiler 822, the example model trainer 824, the example settings identifier 826, the example location identifier 828, the example environment identifier 830, the example content identifier 832, the example model invoker 834, the example depth data manager 836, the example presence evaluator 838, the example proximity evaluator 840, the example notification generator 842, the example feature identifier 844, the example feature invoker 846 and/or, more generally, the example computing device 102 of FIGS. 1-8 may include one or more element(s), process(es) and/or device(s) in addition to, or instead of, those illustrated in FIG. 8, and/or may include more than one of any or all of the illustrated elements, processes and devices. As used herein, the phrase "in communication," including variations thereof, encompasses direct communication and/or indirect communication through one or more intermediary component(s), and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the computing device 102 of FIGS. 1-8 are shown in FIGS. 9-12. The machine readable instructions may be one or more executable program(s) or portion(s) of executable program(s) for execution by a computer processor such as the example processor 1302 shown in the example processor platform 1300 discussed below in connection with FIG. 13. The program(s) may be embodied in software stored on a non-transitory computer readable storage medium such as a CD-ROM, a floppy disk, a hard drive, a DVD, a Blu-ray disk, or a memory associated with the processor 1302, but the entire program(s) and/or parts thereof could alternatively be executed by a device other than the processor 1302 and/or embodied in firmware or dedicated hardware. Further, although the example program(s) is/are described with reference to the flowcharts illustrated in FIGS. 9-12, many other methods of implementing the example computing device 102 of FIG. 1-8 may alternatively be used. For example, the order of execution of the blocks may be changed, and/or some of the blocks described may be changed, eliminated, or combined. Additionally or alternatively, any or all of the blocks may be implemented by one or more hardware circuit(s) (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage device(s) and/or computing device(s) (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 9-12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 9:
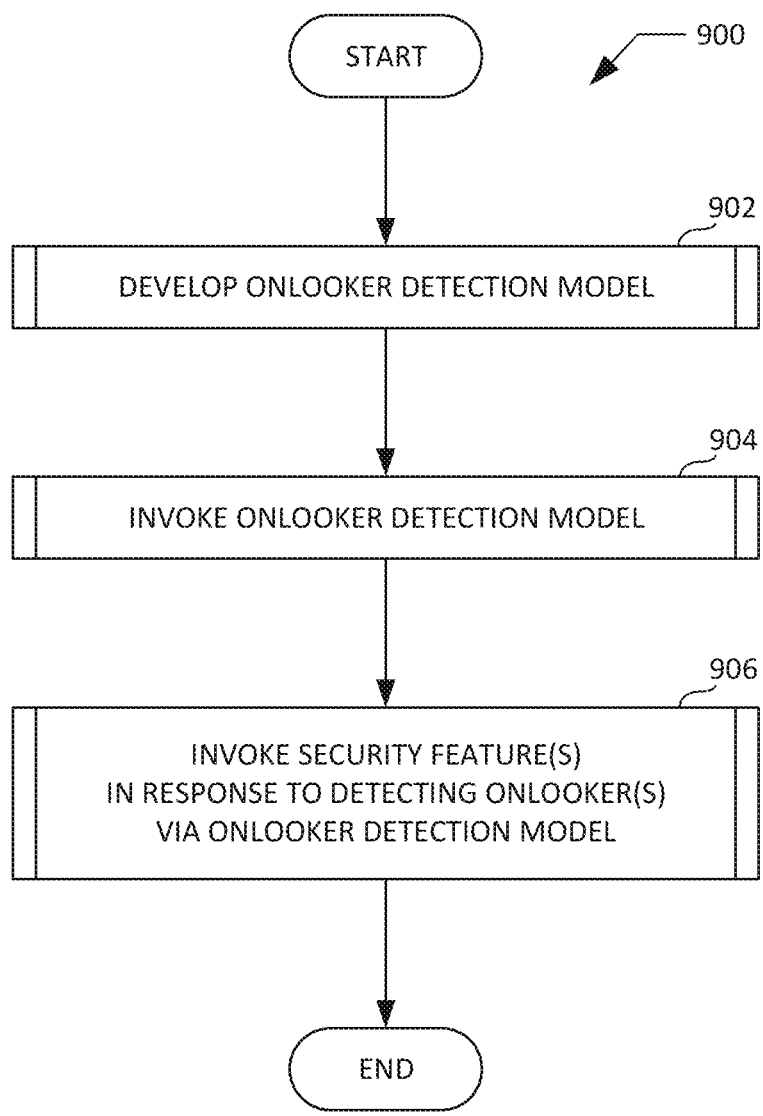
FIG. 9 is a flowchart representative of example machine readable instructions that may be executed to implement the example computing device of FIGS. 1-8 to develop and invoke an onlooker detection model, and to invoke one or more security feature(s) of a display of the computing device in response to detecting one or more onlooker(s) via the onlooker detection model.

FIG. 9 is a flowchart representative of example machine readable instructions 900 that may be executed to implement the example computing device 102 of FIGS. 1-8 to develop and invoke an onlooker detection model, and to invoke one or more security feature(s) of a display of the computing device in response to detecting one or more onlooker(s) via the onlooker detection model. The example program 900 begins when the example model developer 804 of FIG. 8 develops an onlooker detection model (block 902). For example, the model developer 804 may develop an onlooker detection model based on depth data (e.g., multi-zone, anonymous depth data) obtained from the one or more depth sensor(s) 108 of the computing device 102 of FIGS. 1-8. An example process that may be used to implement block 902 of the example program 900 of FIG. 9 is described in greater detail below in connection with FIG. 10. Following block 902, control of the example program 900 of FIG. 9 proceeds to block 904.

At block 904, the example model manager 806 of FIG. 8 invokes the onlooker detection model (block 904). For example, the model manager 806 may invoke the onlooker detection model developed at block 902 based on one or more contextual parameter(s) including, for example, the location at which the computing device 102 of FIGS. 1-8 is being used, the environment type in which the computing device 102 is being used, the content type associated with the information being presented on the display 104 of the computing device 102, the settings of the computing device 102, and/or an input received from an end user of the computing device 102. An example process that may be used to implement block 904 of the example program 900 of FIG. 9 is described in greater detail below in connection with FIG. 11. Following block 904, control of the example program 900 of FIG. 9 proceeds to block 906.

At block 906, the example onlooker detector 808 of FIG. 8 detects one or more onlooker(s) via the onlooker detection model, and the example security manager 810 of FIG. 8 invokes one or more security feature(s) of a display of a computing device in response to the onlooker detector 808 detecting the onlooker(s) (block 906). For example, the onlooker detector 808 may detect one or more onlooker(s) via the onlooker detection model invoked at block 904, and the security manager 810 may invoke one or more security feature(s) of the display 104 of the computing device 102 of FIGS. 1-8 in response to the onlooker detector 808 detecting the onlooker(s). An example process that may be used to implement block 906 of the example program 900 of FIG. 9 is described in greater detail below in connection with FIG. 12. Following block 906, the example program 900 of FIG. 9 ends.

Figure 10:
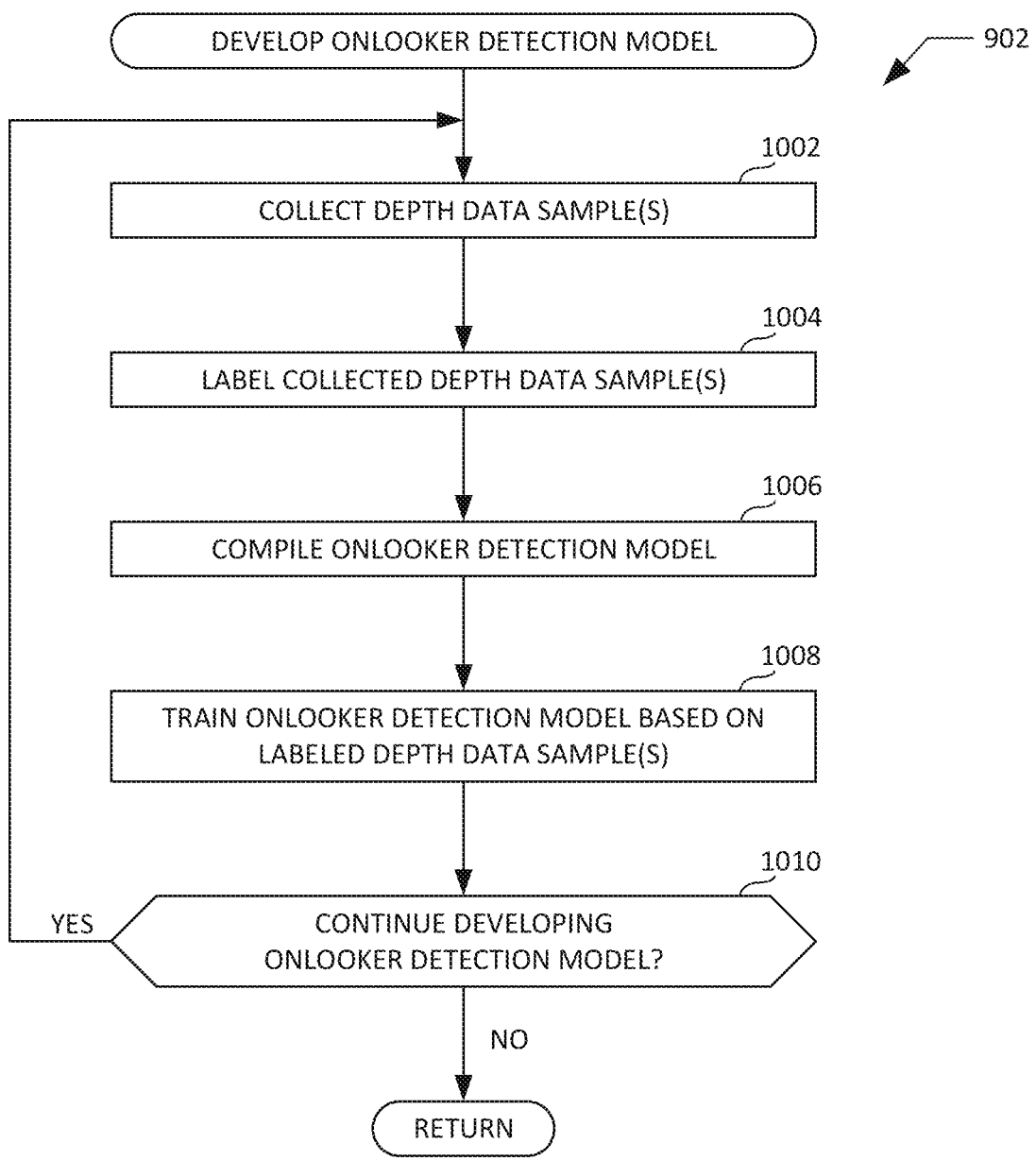
FIG. 10 is a flowchart representative of example machine readable instructions that may be executed to implement the example computing device of FIGS. 1-8 to develop an onlooker detection model.

FIG. 10 is a flowchart representative of example machine readable instructions 902 that may be executed to implement the example computing device 102 of FIGS. 1-8 to develop an onlooker detection model. Example operations of blocks 1002, 1004, 1006, 1008 and 1010 of FIG. 10 may be used to implement block 902 of FIG. 9. The example program 902 of FIG. 10 begins when the example sample collector 818 of the example model developer 804 of FIG. 8 collects one or more sample(s) of depth data (block 1002). For example, the sample collector 818 may collect multiple frames of depth data based on a predetermined sampling rate (e.g., static depth data). In such an example, each collected frame of depth data is a sample. As another example, the sample collector 818 may collect multiple instances of a time series of frames based on a fixed number of frames sampled at a predetermined sampling rate and contained within an instance of a predetermined sliding time-based window (e.g., dynamic depth data). In such an example, each time series of frames included within an instance of the sliding time-based window is a sample. Following block 1002, control of the example program 902 of FIG. 10 proceeds to block 1004.

At block 1004, the example sample labeler 820 of the example model developer 804 of FIG. 8 labels the collected sample(s) of depth data (block 1004). For example, the sample labeler 820 may evaluate each collected sample of depth data (e.g., each collected sample of static or dynamic depth data) to determine whether the depth data of the sample indicates that one or more onlooker(s) is/are present in the field of view of the depth sensor(s) 108. If the sample labeler 820 of FIG. 8 determines that the depth data of the sample indicates that one or more onlooker(s) is/are present in the field of view of the depth sensor(s) 108, the sample labeler 820 labels (e.g., tags, flags, or otherwise associates) the sample as an "onlooker detected" sample. If the sample labeler 820 of FIG. 8 instead determines that the depth data of the sample indicates that no onlookers are present in the field of view of the depth sensor(s) 108, the sample labeler 820 labels (e.g., tags, flags, or otherwise associates) the sample as an "onlooker not detected" sample. In other examples, the sample labeler 820 may additionally or alternatively evaluate each collected sample of depth data (e.g., each collected sample of static or dynamic depth data) to determine whether the depth data of the sample indicates that one or more onlooker(s) is/are located within a proximity threshold (e.g., the first proximity threshold 204 of FIGS. 2-4) defined by a lower boundary distance from the depth sensor(s) 108 (e.g., the lower boundary distance 206 of FIGS. 2-4) and by an upper boundary distance from the depth sensor(s) 108 (e.g., the upper boundary distance 208 of FIGS. 2-4). If the sample labeler 820 of FIG. 8 determines that the depth data of the sample indicates that one or more onlooker(s) is/are present within the proximity threshold associated with the depth sensor(s) 108, the sample labeler 820 labels (e.g., tags, flags, or otherwise associates) the sample as an "onlooker detected" sample. If the sample labeler 820 of FIG. 8 instead determines that the depth data of the sample indicates that no onlookers are located within the proximity threshold associated with the depth sensor(s) 108, the sample labeler 820 labels (e.g., tags, flags, or otherwise associates) the sample as an "onlooker not detected" sample. Following block 1004, control of the example program 902 of FIG. 10 proceeds to block 1006.

At block 1006, the example model compiler 822 of the example model developer 804 of FIG. 8 compiles an onlooker detection model (block 1006). For example, the model compiler 822 may transform high-level source code associated with an onlooker detection model into a low level object code (e.g., binary code) in machine language which can be understood by one or more processor(s) of the computing device 102. Following block 1006, control of the example program 902 of FIG. 10 proceeds to block 1008.

At block 1008, the example model trainer 824 of the example model developer 804 of FIG. 8 trains the onlooker detection model based on the labeled sample(s) of depth data (block 1008). For example, the model trainer 824 may train an onlooker detection model implemented as a CNN model, an SVM model, a KNN model, or a ConvLSTM model. In some examples, the model trainer 824 trains the onlooker detection model with labeled samples of static depth data. In such examples, the model trainer 824 may process the samples of static depth data on a sample-by-sample (e.g., frame-by-frame) basis, and may train the onlooker detection model based on the specific label (e.g., "onlooker detected" versus "onlooker not detected") associated with each sample of static depth data. In other examples, the model trainer 824 trains the onlooker detection model with labeled samples of dynamic depth data. In such other examples, the model trainer 824 may process the samples of dynamic depth data on a sample-by-sample (e.g., window-by-window) basis, and may train the onlooker detection model based on the specific label (e.g., "onlooker detected" versus "onlooker not detected") associated with each sample of dynamic depth data. Following block 1008, control of the example program 902 of FIG. 10 proceeds to block 1010.

At block 1010, the example model developer 804 of FIG. 8 determines whether to continue developing the onlooker detection model (block 1010). For example, the model developer 804 may receive one or more command(s) and/or instruction(s) indicating that the process of developing the onlooker detection model is to be discontinued. In some examples, the command(s) and/or instruction(s) may be based on one or more requirement(s) and/or setting(s) of the computing device 102. In other examples, the command(s) and/or instruction(s) may be based on one or more end-user input(s) received via one or more of the input device(s) 814 of the user interface 802 of FIG. 2. If the model developer 804 determines at block 1010 that the process of developing the onlooker detection model is to be continued, control of the example program 902 of FIG. 10 returns to block 1002. If the model developer 804 instead determines at block 1010 that the process of developing the onlooker detection model is to be discontinued, control of the example program 902 of FIG. 10 returns to a function call such as block 902 of the example program 900 of FIG. 9.

Figure 11:
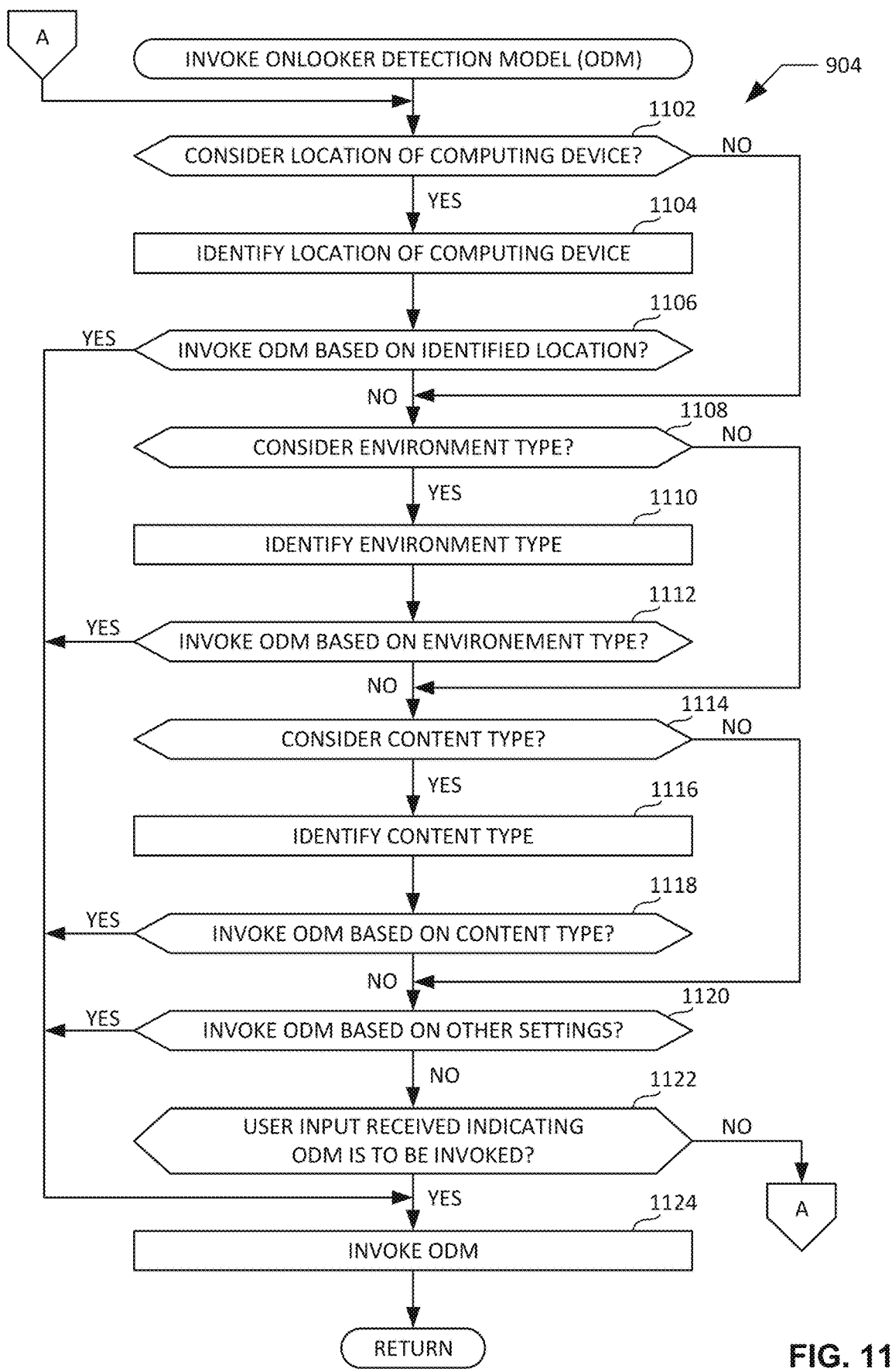
FIG. 11 is a flowchart representative of example machine readable instructions that may be executed to implement the example computing device of FIGS. 1-8 to invoke an onlooker detection model.

FIG. 11 is a flowchart representative of example machine readable instructions 904 that may be executed to implement the example computing device 102 of FIGS. 1-8 to invoke an onlooker detection model. Example operations of blocks 1102, 1104, 1106, 1108, 1110, 1112, 1114, 1116, 1118, 1120, 1122 and 1124 of FIG. 11 may be used to implement block 904 of FIG. 9. The example program 904 of FIG. 11 begins when the example settings identifier 826 of the example model manager 806 of FIG. 8 determines whether to consider the location at which the computing device is being used (block 1102). For example, the settings identifier 826 may identify and/or determine, based on a setting and/or based on an end user input, that the model manager 806 is to consider the location at which the computing device 102 of FIGS. 1-8 is being used. If the settings identifier 826 determines at block 1102 that the location of the computing device 102 is to be considered, control of the example program 904 of FIG. 11 proceeds to block 1104. If the settings identifier 826 instead determines at block 1102 that the location of the computing device 102 is not to be considered, control of the example program 904 of FIG. 11 proceeds to block 1108.

At block 1104, the example location identifier 828 of the example model manager 806 of FIG. 8 identifies the location of the computing device (block 1104). For example, the location identifier 828 may identify and/or determine the location of the computing device 102 of FIGS. 1-8 based on location data collected by a GPS receiver of the computing device 102. In other examples, the location identifier 828 may identify and/or determine the location of the computing device 102 of FIGS. 1-8 based on location data determined (e.g., via triangulation or via a network connection) by radio hardware (e.g., a transmitter, a receiver, a transceiver, etc.) of the computing device 102. In still other examples, the location identifier 828 may identify and/or determine the location of the computing device 102 of FIGS. 1-8 based on location data derived from an IP address associated with the computing device 102. In still other examples, the location identifier 828 may identify and/or determine the location of the computing device 102 of FIGS. 1-8 based on location data input by an end user via the input device(s) 814 of the user interface 802 of FIG. 8. Following block 1104, control of the example program 904 of FIG. 11 proceeds to block 1106.

At block 1106, the example model manager 806 of FIG. 8 determines whether to invoke the onlooker detection model based on the identified location of the computing device (block 1106). For example, the model manager 806 may determine that the onlooker detection model should be invoked when the location identified by the location identifier 828 of FIG. 8 is more than a threshold distance away from a predetermined secure location. If the model manager 806 determines at block 1106 that the onlooker detection model is not to be invoked based on the identified location of the computing device 102, control of the example program 904 of FIG. 11 proceeds to block 1108. If the model manager 806 instead determines at block 1106 that the onlooker detection model is to be invoked based on the identified location of the computing device 102, control of the example program 904 of FIG. 11 proceeds to block 1124.

At block 1108, the example settings identifier 826 of the example model manager 806 of FIG. 8 determines whether to consider the environment type in which the computing device is being used (block 1108). For example, the settings identifier 826 may identify and/or determine, based on a setting and/or based on an end user input, that the model manager 806 is to consider the environment type in which the computing device 102 of FIGS. 1-8 is being used. If the settings identifier 826 determines at block 1108 that the environment type is to be considered, control of the example program 904 of FIG. 11 proceeds to block 1110. If the settings identifier 826 instead determines at block 1108 that the environment type is not to be considered, control of the example program 904 of FIG. 11 proceeds to block 1114.

At block 1110, the example environment identifier 830 of the example model manager 806 of FIG. 8 identifies the environment type in which the computing device is being used (block 1110). For example, the environment identifier 830 may identify and/or determine the environment type as being either a private (e.g., secure) environment or a public (e.g., unsecure) environment. In some examples, the environment identifier 830 identifies and/or determines the environment type based on the location data identified and/or determined by the location identifier 828 of FIG. 8. For example, the environment identifier 830 may identify and/or determine that the location data corresponds to a private environment (e.g., an end user's workplace, an end-user's home, etc.), or may instead identify and/or determine that the location data corresponds to a public environment (e.g., a library, a coffee shop, an airport, etc.). In other examples, the environment identifier 830 may identify and/or determine the environment type in which the computing device 102 is being used based on environment type data input by an end user via the input device(s) 814 of the user interface 802 of FIG. 8. Following block 1110, control of the example program 904 of FIG. 11 proceeds to block 1112.

At block 1112, the example model manager 806 of FIG. 8 determines whether to invoke the onlooker detection model based on the identified environment type (block 1112). For example, the model manager 806 may determine that the onlooker detection model should be invoked when the environment type identified by the environment identifier 830 of FIG. 8 is and/or corresponds to a public (e.g., unsecure) environment. If the model manager 806 determines at block 1112 that the onlooker detection model is not to be invoked based on the identified environment type, control of the example program 904 of FIG. 11 proceeds to block 1114. If the model manager 806 instead determines at block 1112 that the onlooker detection model is to be invoked based on the identified environment type, control of the example program 904 of FIG. 11 proceeds to block 1124.

At block 1114, the example settings identifier 826 of the example model manager 806 of FIG. 8 determines whether to consider the content type associated with the information being presented on the display of the computing device (block 1114). For example, the settings identifier 826 may identify and/or determine, based on a setting and/or based on an end user input, that the model manager 806 is to consider the content type associated with the information being presented on the display 104 of the computing device 102 of FIGS. 1-8. If the settings identifier 826 determines at block 1114 that the content type is to be considered, control of the example program 904 of FIG. 11 proceeds to block 1116. If the settings identifier 826 instead determines at block 1114 that the content type is not to be considered, control of the example program 904 of FIG. 11 proceeds to block 1120.

At block 1116, the example content identifier 832 of the example model manager 806 of FIG. 8 identifies the content type associated with the information being presented on the display of the computing device (block 1116). For example, the content identifier 832 may identify and/or determine that metadata associated with the information 116 indicates (e.g., via a tag, flag, label, etc.) that the information 116 is confidential content, or may instead identify and/or determine that the metadata indicates (e.g., via a tag, flag, label, etc.) that the information 116 is non-confidential content. In other examples, the content identifier 832 may identify and/or determine the content type associated with the information 116 being presented on the display 104 of the computing device 102 based on content type data input by an end user via the input device(s) 814 of the user interface 802 of FIG. 8. Following block 1116, control of the example program 904 of FIG. 11 proceeds to block 1118.

At block 1118, the example model manager 806 of FIG. 8 determines whether to invoke the onlooker detection model based on the identified content type (block 1118). For example, the model manager 806 may determine that the onlooker detection model should be invoked when the content type identified by the content identifier 832 of FIG. 8 is and/or corresponds to confidential content. If the model manager 806 determines at block 1118 that the onlooker detection model is not to be invoked based on the identified content type, control of the example program 904 of FIG. 11 proceeds to block 1120. If the model manager 806 instead determines at block 1118 that the onlooker detection model is to be invoked based on the identified content type, control of the example program 904 of FIG. 11 proceeds to block 1124.

At block 1120, the example model manager 806 of FIG. 8 determines whether to invoke the onlooker detection model based any other settings identified by the settings identifier 826 of the model manager 806 (block 1120). For example, the settings identifier 826 may identify and/or determine based on another setting that the model manager 806 is to invoke the onlooker detection model by default and/or without consideration of any contextual parameters. If the model manager 806 determines at block 1120 that the onlooker detection model is not to be invoked based on any other settings identified by the settings identifier 826, control of the example program 904 of FIG. 11 proceeds to block 1122. If the model manager 806 instead determines at block 1120 that the onlooker detection model is to be invoked based on one or more other setting(s) identified by the settings identifier 826, control of the example program 904 of FIG. 11 proceeds to block 1124.

At block 1122, the example model manager 806 of FIG. 8 determines whether a user input has been received via the example user interface 802 of FIG. 8 indicating that the onlooker detection model is to be invoked (block 1122). For example, the settings identifier 826 may identify and/or determine, based on an end user input, that the model manager 806 is to invoke the onlooker detection model, without consideration of any contextual parameters. If the model manager 806 determines at block 1122 that a user input has not been received via the user interface 802 indicating that the onlooker detection model is to be invoked, control of the example program 904 of FIG. 11 returns to block 1102. If the model manager 806 instead determines at block 1122 that a user input has been received via the user interface 802 indicating that the onlooker detection model is to be invoked, control of the example program 904 of FIG. 11 proceeds to block 1124.

At block 1124, the example model invoker 834 of the example model manager 806 of FIG. 8 invokes the onlooker detection model (block 1124). For example, the model invoker 834 may invoke and/or execute the onlooker detection model compiled by the model compiler 822 and/or, more generally, developed by the model developer 804 of FIG. 8. In some examples, the model invoker 834 invokes and/or executes the onlooker detection model based on one or more command(s) and/or instruction(s) received from the model manager 806 of FIG. 8. In other examples, the model invoker 834 invokes and/or executes the onlooker detection model based on one or more command(s) and/or instruction(s) received from the user interface 802 of FIG. 8 (e.g., in response to one or more end user input(s) provided to the input device(s) 814 of the user interface 802). Following block 1124, control of the example program 904 of FIG. 11 returns to a function call such as block 904 of the example program 900 of FIG. 9.

Figure 12:
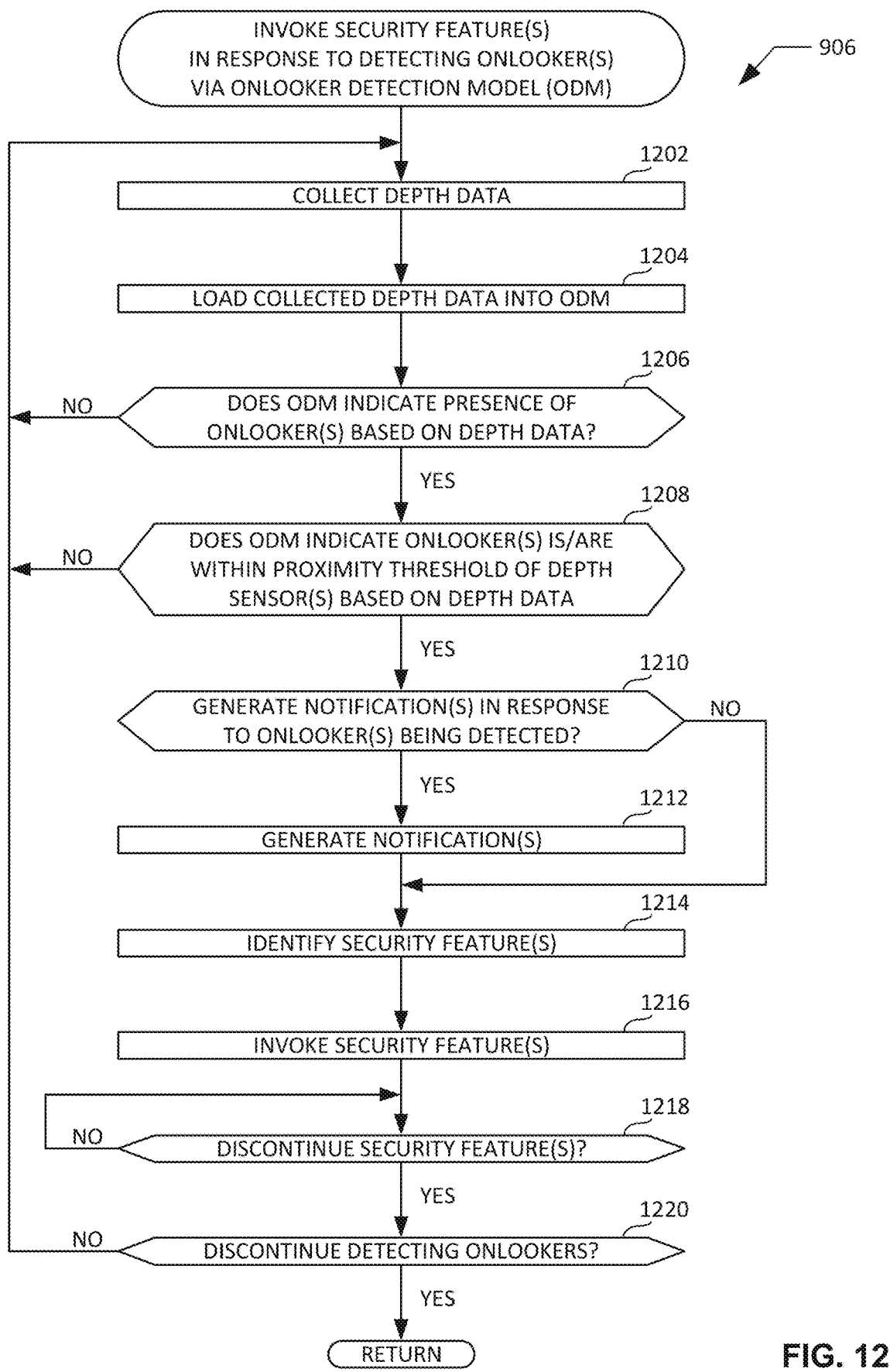
FIG. 12 is a flowchart representative of example machine readable instructions that may be executed to implement the example computing device of FIGS. 1-8 to invoke one or more security feature(s) of a display of the computing device in response to detecting one or more onlooker(s) via an onlooker detection model.

FIG. 12 is a flowchart representative of example machine readable instructions 906 that may be executed to implement the example computing device 102 of FIGS. 1-8 to invoke one or more security feature(s) of a display of the computing device 102 in response to detecting one or more onlooker(s) via an onlooker detection model. Example operations of blocks 1202, 1204, 1206, 1208, 1210, 1212, 1214, 1216, 1218 and 1220 of FIG. 12 may be used to implement block 906 of FIG. 9. The example program 906 of FIG. 12 begins when the example depth data manager 836 of the example onlooker detector 808 of FIG. 8 collects depth data (block 1202). For example, the depth data manager 836 may collect depth data sensed, measured and/or detected by the depth sensor(s) 108 of FIGS. 1-8. In some examples, the depth data manager 836 collects one or more frame(s) of depth data based on a predetermined sampling rate (e.g., static depth data). In other examples, the depth data manager 836 may collect one or more instance(s) of a time series of frames based on a fixed number of frames sampled at a predetermined sampling rate and contained within an instance of a predetermined sliding time-based window (e.g., dynamic depth data). Following block 1202, control of the example program 906 of FIG. 12 proceeds to block 1204.

At block 1204, the example depth data manager 836 of the example onlooker detector 808 of FIG. 8 loads the collected depth data into the onlooker detection model (block 1204). For example, the depth data manager 836 may load the collected depth data into the onlooker detection model in response to the model invoker 834 of the model manager 806 of FIG. 8 invoking and/or executing the onlooker detection model. Following block 1204, control of the example program 906 of FIG. 12 proceeds to block 1206.

At block 1206, the example presence evaluator 838 of the example onlooker detector 808 of FIG. 8 determines whether the onlooker detection model indicates the presence of one or more onlooker(s) based on the loaded depth data (block 1206). For example, the presence evaluator 838 may determine, based on the depth data loaded into the onlooker detection model, that the onlooker detection model indicates the presence of an onlooker (e.g., the onlooker 302 of FIGS. 3, 4, 6 and 7) within the field of view of the depth sensor(s) 108 of the computing device 102 of FIGS. 1-8. If the presence evaluator 838 determines at block 1206 that the onlooker detection model does not indicate the presence of one or more onlooker(s) based on the loaded depth data, control of the example program 906 of FIG. 12 returns to block 1202. If the presence evaluator 838 instead determines at block 1206 that the onlooker detection model indicates the presence of one or more onlooker(s) based on the loaded depth data, control of the example program 906 of FIG. 12 proceeds to block 1208.

At block 1208, the example proximity evaluator 840 of the example onlooker detector 808 of FIG. 8 determines whether the onlooker detection model indicates that one or more onlooker(s) is/are located within a proximity threshold of the depth sensor(s) 108 of the computing device 102 of FIGS. 1-8 based on the loaded depth data (block 1208). For example, the proximity evaluator 840 may determine, based on the depth data loaded into the onlooker detection model, that the onlooker detection model indicates an onlooker (e.g., the onlooker 302 of FIGS. 3, 4, 6 and 7) is/are located within a proximity threshold defined by one or more boundary distance(s) (e.g., the first proximity threshold 204 defined by the lower boundary distance 206 and the upper boundary distance 208 of FIGS. 2-4) from the depth sensor(s) 108 of the computing device 102 of FIGS. 1-8. If the proximity evaluator 840 determines at block 1208 that the onlooker detection model does not indicate the that one or more onlooker(s) is/are located within a proximity threshold of the depth sensor(s) 108, control of the example program 906 of FIG. 12 returns to block 1202. If the proximity evaluator 840 instead determines at block 1208 that the onlooker detection model indicates that one or more onlooker(s) is/are located within a proximity threshold of the depth sensor(s) 108, control of the example program 906 of FIG. 12 proceeds to block 1210.

At block 1210, the example security manager 810 determines whether one or more notification(s) is/are to be generated in response to the onlooker detector 808 of FIG. 8 detecting one or more onlooker(s) (block 1210). For example, the security manager 810 may identify and/or determine that one or more notification(s) is/are to be generated based on one or more setting(s) (e.g., requirement(s), preference(s), etc.) of the computing device 102, and/or based on one or more input(s) received via the user interface 802 of FIG. 8 from an end user of the computing device 102. If the security manager 810 determines at block 1210 that one or more notification(s) is/are to be generated, control of the example program 906 of FIG. 12 proceeds to block 1212. If the security manager 810 instead determines at block 1210 that no notifications are to be generated, control of the example program 906 of FIG. 12 proceeds to block 1214.

At block 1212, the example notification generator 842 of the example security manager 810 of FIG. 8 generates one or more notification(s) (e.g., one or more textual, graphical and/or audible notification(s)) to be presented via the display 104 and/or via the output device(s) 816 of the user interface 802 of FIG. 8 (block 1212). In some examples, the notification(s) indicate to and/or notify an end user (e.g., the end user 114 of FIGS. 1-7) that one or more onlooker(s) (e.g., the onlooker 302 of FIGS. 3, 4, 6 and 7) has/have been detected by the onlooker detector 808 of FIG. 8. In some examples, the notification(s) additionally or alternatively indicate to and/or notify the end user 114 that one or more security feature(s) of the display 104 is/are to be invoked by the feature invoker 846 and/or, more generally, by the security manager 810 of FIG. 8. Following block 1212, control of the example program 906 of FIG. 12 proceeds to block 1214.

At block 1214, the example feature identifier 844 of the example security manager 810 of FIG. 8 identifies and/or determines one or more security feature(s) of the display 104 to be invoked (block 1214). In some examples, the feature identifier 844 identifies and/or determines the security feature(s) based on one or more setting(s) (e.g., requirement(s), preference(s), etc.) of the computing device 102, and/or based on one or more input(s) received via the user interface 802 of FIG. 8 from an end user of the computing device 102. In some examples, the identified security feature(s) can include reducing the size (e.g., the font size, the image size, etc.) of the information 116 as presented on the screen 110 of the display 104 relative to the size at which the information 116 would otherwise be presented on the screen 110 of the display 104 in the absence of a detected onlooker. The identified security feature(s) can additionally or alternatively include narrowing the viewable width of the information 116 as presented on the screen 110 of the display 104 relative to the viewable width at which the information 116 would otherwise be presented on the screen 110 of the display 104 in the absence of a detected onlooker. The identified security feature(s) can additionally or alternatively include blurring (e.g., obscuring, filtering, blacking out, etc.) the information 116 as presented on the screen 110 of the display relative to the clarity with which the information 116 would otherwise be presented on the screen 110 of the display 104 in the absence of a detected onlooker. The identified security feature(s) can additionally or alternatively include decreasing the brightness of the backlighting projected onto the screen 110 of the display 104 relative to the brightness at which the backlighting would otherwise be projected onto the screen 110 of the display 104 in the absence of a detected onlooker. The identified security feature(s) can additionally or alternatively include redirecting and/or refocusing the backlighting projected onto the screen 110 of the display 104 relative to direction and/or the focus with which the backlighting would otherwise be projected onto the screen 110 of the display 104 in the absence of a detected onlooker. Following block 1214, control of the example program 906 of FIG. 12 proceeds to block 1216.

At block 1216, the example feature invoker 846 of the example security manager 810 of FIG. 8 invokes and/or executes the security feature(s) of the display 104 (block 1216). For example, the feature invoker 846 may invoke and/or execute the security feature(s) identified and/or determined by the feature identifier 844 of FIG. 8. In some examples, the feature invoker 846 invokes and/or executes the security feature(s) based on one or more command(s) and/or instruction(s) received from the security manager 810 of FIG. 8. Following block 1216, control of the example program 906 of FIG. 12 proceeds to block 1218.

At block 1218, the security manager 810 of FIG. 8 determines whether to discontinue the invoked security feature(s) (block 1218). For example, the security manager 810 may receive one or more command(s) and/or instruction(s) indicating that the invocation of the security features(s) is to be discontinued. In some examples, the command(s) and/or instruction(s) may be based on one or more requirement(s) and/or setting(s) of the computing device 102. In other examples, the command(s) and/or instruction(s) may be based on one or more end-user input(s) received via one or more of the input device(s) 814 of the user interface 802 of FIG. 2. If the security manager 810 determines at block 1218 that the invocation of the security feature(s) is to be continued, control of the example program 906 of FIG. 12 remains at block 1218. If the security manager 810 instead determines at block 1218 that the invocation of the security feature(s) is to be discontinued, control of the example program 906 of FIG. 12 proceeds to block 1220.

At block 1220, the example onlooker detector 808 of FIG. 8 determines whether to discontinue detecting onlookers (block 1220). For example, the onlooker detector 808 may receive one or more command(s) and/or instruction(s) indicating that the process of detecting onlookers is to be discontinued. In some examples, the command(s) and/or instruction(s) may be based on one or more requirement(s) and/or setting(s) of the computing device 102. In other examples, the command(s) and/or instruction(s) may be based on one or more end-user input(s) received via one or more of the input device(s) 814 of the user interface 802 of FIG. 2. If the onlooker detector 808 determines at block 1220 that the process of detecting onlookers is to be continued, control of the example program 906 of FIG. 12 returns to block 1202. If the onlooker detector 808 instead determines at block 1220 that the process of detecting onlookers is to be discontinued, control of the example program 906 of FIG. 12 returns to a function call such as block 906 of the example program 900 of FIG. 9.

Figure 13:
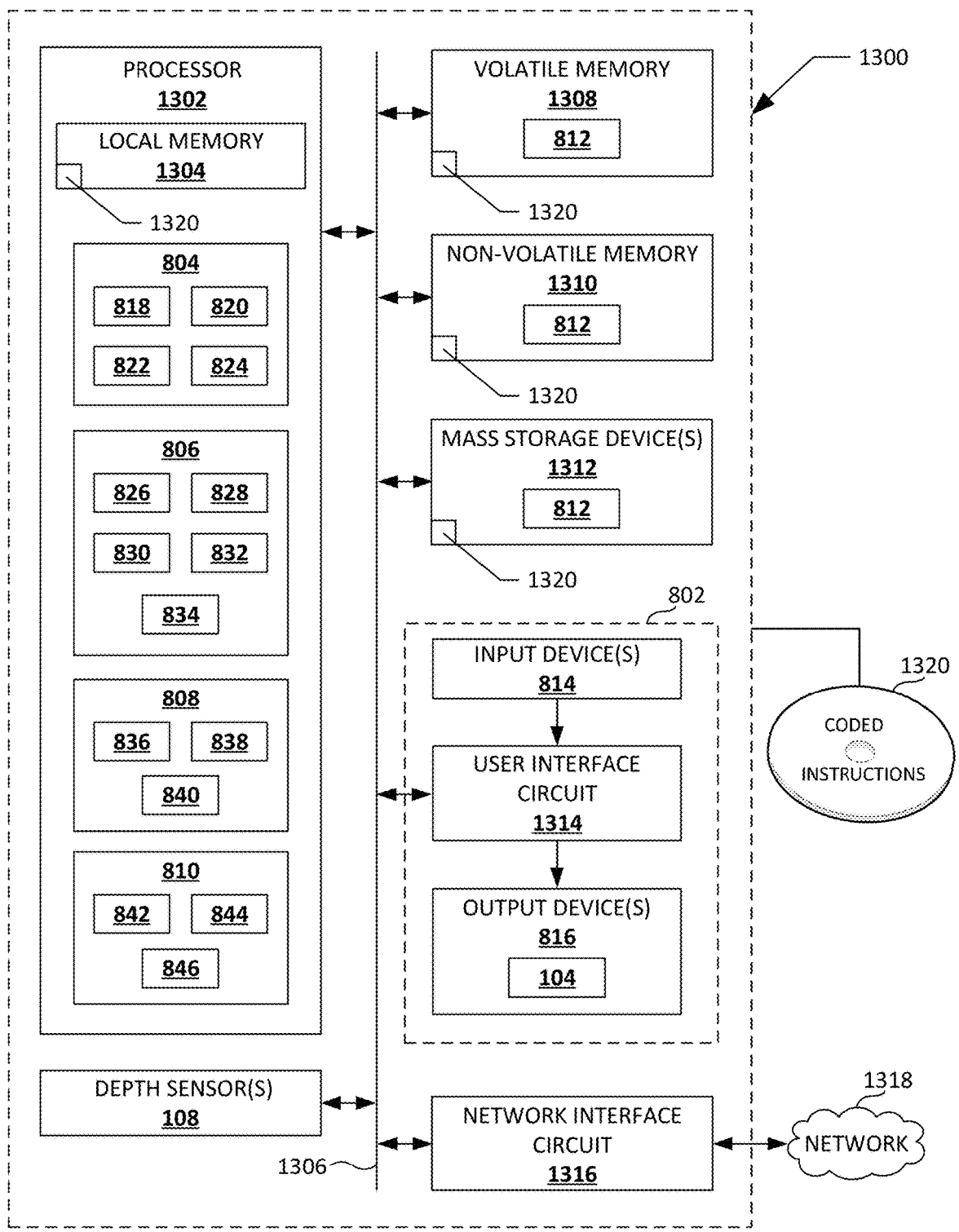
FIG. 13 is a block diagram of an example processor platform structured to execute the example instructions of FIGS. 9-12 to implement the example computing device of FIGS. 1-8.

FIG. 13 is a block diagram of an example processor platform 1300 structured to execute the example instructions 900 of FIGS. 9-12 to implement the example computing device 102 of FIGS. 1-8. The processor platform 1300 of the illustrated example includes a processor 1302. The processor 1302 of the illustrated example is hardware. For example, the processor 1302 can be implemented by one or more integrated circuit(s), logic circuit(s), microprocessor(s), GPU(s), DSP(s), microcontroller(s), processor(s), or microcontroller(s) from any desired family or manufacturer. The hardware processor may be a semiconductor based (e.g., silicon based) device. In this example, the processor 1302 implements the example model developer 804, the example model manager 806, the example onlooker detector 808, the example security manager 810, the example sample collector 818, the example sample labeler 820, the example model compiler 822, the example model trainer 824, the example settings identifier 826, the example location identifier 828, the example environment identifier 830, the example content identifier 832, the example model invoker 834, the example depth data manager 836, the example presence evaluator 838, the example proximity evaluator 840, the example notification generator 842, the example feature identifier 844, and the example feature invoker 846 of FIG. 8.

The processor 1302 of the illustrated example includes a local memory 1304 (e.g., a cache). The processor 1302 is also in communication with the example depth sensor(s) 108 of FIG. 8 via a bus 1306. The processor 1302 is also in communication with a main memory including a volatile memory 1308 and a non-volatile memory 1310 via the bus 1306. The volatile memory 1308 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1310 may be implemented by flash memory and/or any other desired type of memory device. Access to the main memory 1308, 1310 is controlled by a memory controller.

The processor platform 1300 of the illustrated example also includes one or more mass storage device(s) 1312 for storing software and/or data. Examples of such mass storage device(s) 1312 include floppy disk drives, hard drive disks, compact disk drives, Blu-ray disk drives, redundant array of independent disks (RAID) systems, and digital versatile disk (DVD) drives. In the illustrated example of FIG. 13, one or more of the volatile memory 1308, the non-volatile memory 1310, and/or the mass storage device(s) 1312 implement(s) the example memory 812 of FIG. 8.

The processor platform 1300 of the illustrated example also includes a user interface circuit 1314. The user interface circuit 1314 may be implemented by any type of interface standard, such as an Ethernet interface, a universal serial bus (USB), a Bluetooth® interface, a near field communication (NFC) interface, and/or a PCI express interface. In the illustrated example, one or more input device(s) 814 of FIG. 8 are connected to the user interface circuit 1314. The input device(s) 814 permit(s) a user to enter data and/or commands into the processor 1302. The input device(s) 814 can be implemented by, for example, an audio sensor, a microphone, a camera (still or video), a keyboard, a button, a mouse, a touchscreen, a track-pad, a trackball, isopoint and/or a voice recognition system. One or more output device(s) 816 of FIG. 8 are also connected to the user interface circuit 1314 of the illustrated example. The output device(s) 816 can be implemented, for example, by display devices (e.g., a light emitting diode (LED), an organic light emitting diode (OLED), a liquid crystal display (LCD), a touchscreen, etc.) including the display 104 of FIG. 8, a tactile output device, and/or a speaker. The user interface circuit 1314 of the illustrated example, thus, typically includes a graphics driver card, a graphics driver chip and/or a graphics driver processor. In the illustrated example, the input device(s) 814, the output device(s) 816, and the user interface circuit 1314 collectively implement the example user interface 802 of FIG. 8.

The processor platform 1300 of the illustrated example also includes a network interface circuit 1316. The network interface circuit 1316 may be implemented by any type of interface standard, such as an Ethernet interface, a universal serial bus (USB), a Bluetooth® interface, a near field communication (NFC) interface, and/or a PCI express interface. The network interface circuit 1316 may include a radio transmitter, a radio receiver, and/or a radio transceiver to facilitate the exchange of data and/or signals with external machines (e.g., a server, other computing devices, etc.) via a network 1318 (e.g., a cellular network, a wireless local area network (WLAN), etc.).

Coded instructions 1320 including the machine readable instructions 900 of FIGS. 9-12 may be stored in the local memory 1304, in the volatile memory 1308, in the non-volatile memory 1310, on the mass storage device(s) 1312, and/or on a removable non-transitory computer readable storage medium such as a flash memory stick, a CD, or a DVD.

From the foregoing, it will be appreciated that methods and apparatus have been disclosed that automatically invoke a security feature of a display of a computing device in response to detecting an onlooker based on depth data. Example methods and apparatus advantageously detect onlookers based on depth data obtained from one or more depth sensor(s) (e.g., an infrared sensor, a RADAR sensor, a LIDAR sensor, a UWB sensor, an ultrasonic sensor, a TOF sensor, an image sensor, etc.) of a computing device. In contrast to the image data obtained via the known solutions described above, the depth data obtained via example methods and apparatus disclosed herein is anonymous. The use of such anonymous depth data, as opposed to invasive image data from which the identity of an individual can be determined, reduces (e.g., eliminates) any privacy concerns that might arise in connection with implementing example methods and apparatus disclosed herein at certain locations and/or in certain environments.

Example methods and apparatus also advantageously automate the process of invoking a security feature of a display of a computing device in response to detecting an onlooker. In contrast to the known solutions described above, example methods and apparatus disclosed herein automatically invoke a security feature of a display of a computing device in response to detecting an onlooker, and do so without relying on manual input from an end user subsequent to an onlooker being detected. Eliminating the need for manual input from the end user to invoke the security feature advantageously improves (e.g., decreases) the response time associated with invoking the security feature of the display subsequent to an onlooker being detected, thereby reducing (e.g., eliminating) the possibility that the onlooker might be able to view the information being presented on the display of the computing device prior to the security feature becoming invoked. Eliminating the need for manual input from the end user to invoke the security feature also advantageously reduces (e.g., eliminates) repeated prompts to the end user requesting such manual input, and accordingly provides for an improved end user experience relative to that provided by the known solutions described above.

In some examples, an apparatus is disclosed. In some disclosed examples, the apparatus comprises an onlooker detector and a security manager. In some disclosed examples, the onlooker detector is to detect an onlooker based on depth sensor data collected by a depth sensor associated with a computing device. In some disclosed examples, the security manager is to automatically invoke a security feature of a display of the computing device in response to detection of the onlooker by the onlooker detector.

In some disclosed examples, the depth sensor includes at least one of an infrared sensor, a radio detection and ranging sensor, a light detection and ranging sensor, an ultra-wideband sensor, an ultrasonic sensor, a time-of-flight sensor, or an image sensor.

In some disclosed examples, the depth sensor data is anonymous relative to the onlooker.

In some disclosed examples, the onlooker detector is to differentiate the onlooker from an end user of the computing device.

In some disclosed examples, the apparatus further includes a presence evaluator to detect the onlooker within a field of view of the depth sensor.

In some disclosed examples, the apparatus further includes a proximity evaluator to detect the onlooker within a proximity threshold defined by at least one boundary distance from the depth sensor.

In some disclosed examples, the security feature is to at least one of reduce a size of information being presented on a screen of the display, narrow a viewable width of information being presented on a screen of the display, blur information being presented on a screen of the display, decrease a brightness of a backlighting being projected onto a screen of the display, or redirect a backlighting being projected onto a screen of the display.

In some disclosed examples, the onlooker detector is to detect the onlooker based on an onlooker detection model. In some disclosed examples, the apparatus further includes a sample collector to collect samples of depth data sensed by the depth sensor. In some disclosed examples, the apparatus further includes a sample labeler to label respective ones of the collected samples as either including or not including an onlooker. In some disclosed examples, the apparatus further includes a model trainer to train the onlooker detection model based on the labeled samples.

In some disclosed examples, the onlooker detector is to detect the onlooker based on an onlooker detection model. In some disclosed examples, the apparatus further includes a model invoker to invoke the onlooker detection model based on satisfaction of at least one contextual parameter.

In some disclosed examples, the at least one contextual parameter includes one or more of a location of the computing device, an environment type associated with the computing device, or a content type associated with information presented on the display of the computing device.

In some examples, a non-transitory computer-readable storage medium is disclosed. In some disclosed examples, the instructions, when executed, cause one or more processors of a computing device to detect an onlooker based on depth sensor data collected from a depth sensor associated with the computing device. In some disclosed examples, the instructions, when executed, further cause the one or more processors to invoke a security feature of a display of the computing device in response to the detection of the onlooker.

In some disclosed examples, the depth sensor includes at least one of an infrared sensor, a radio detection and ranging sensor, a light detection and ranging sensor, an ultra-wideband sensor, an ultrasonic sensor, a time-of-flight sensor, or an image sensor.

In some disclosed examples, the depth sensor data is anonymous relative to the onlooker.

In some disclosed examples, the instructions, when executed, cause the one or more processors to differentiate the onlooker from an end user of the computing device.

In some disclosed examples, the instructions, when executed, cause the one or more processors to invoke the security feature in response to detection of the onlooker within a field of view of the depth sensor.

In some disclosed examples, the instructions, when executed, cause the one or more processors to invoke the security feature in response to detection of the onlooker within a proximity threshold defined by at least one boundary distance from the depth sensor.

In some disclosed examples, the security feature is to at least one of reduce a size of information being presented on a screen of the display, narrow a viewable width of information being presented on a screen of the display, blur information being presented on a screen of the display, decrease a brightness of a backlighting being projected onto a screen of the display, or redirect a backlighting being projected onto a screen of the display.

In some disclosed examples, the instructions, when executed, cause the one or more processors to collect samples of depth data based on outputs of the depth sensor. In some disclosed examples, the instructions, when executed, cause the one or more processors to label respective ones of the collected samples as either including or not including an onlooker. In some disclosed examples, the instructions, when executed, cause the one or more processors to train an onlooker detection model based on the labeled samples. In some disclosed examples, the instructions, when executed, cause the one or more processors to detect the onlooker based on the trained onlooker detection model.

In some disclosed examples, the instructions, when executed, cause the one or more processors to invoke an onlooker detection model based on satisfaction of at least one contextual parameter. In some disclosed examples, the instructions, when executed, cause the one or more processors to detect the onlooker based on the invoked onlooker detection model.

In some disclosed examples, the at least one contextual parameter includes one or more of a location of the computing device, an environment associated with use of the computing device, or a content type associated with information presented on the display of the computing device.

In some examples, a method is disclosed. In some disclosed examples, the method comprises detecting, by executing a computer-readable instruction with one or more processors of a computing device, an onlooker based on outputs from a depth sensor associated with the computing device. In some disclosed examples, the method further comprises invoking, by executing a computer-readable instruction with the one or more processors, a security feature of a display of the computing device in response to the detecting of the onlooker.

In some disclosed examples, the depth sensor includes at least one of an infrared sensor, a radio detection and ranging sensor, a light detection and ranging sensor, an ultra-wideband sensor, an ultrasonic sensor, a time-of-flight sensor, or an image sensor.

In some disclosed examples, the depth sensor data is anonymous relative to the onlooker.

In some disclosed examples, the detecting of the onlooker includes differentiating the onlooker from an end user of the computing device.

In some disclosed examples, the detecting of the onlooker includes detecting the onlooker is located within a field of view of the depth sensor.

In some disclosed examples, the detecting of the onlooker includes detecting the onlooker is located within a proximity threshold defined by at least one boundary distance from the depth sensor.

In some disclosed examples, the invoking of the security feature includes at least one of reducing a size of information being presented on a screen of the display, narrowing a viewable width of information being presented on a screen of the display, blurring information being presented on a screen of the display, decreasing a brightness of a backlighting being projected onto a screen of the display, or redirecting a backlighting being projected onto a screen of the display.

In some disclosed examples, the method further includes labeling, by executing a computer-readable instruction with the one or more processors, respective ones of samples originating from the depth sensor as either including or not including an onlooker. In some disclosed examples, the method further includes training, by executing a computer-readable instruction with the one or more processors, an onlooker detection model based on the labeled samples. In some disclosed examples, the method further includes detecting, by executing a computer-readable instruction with the one or more processors, the onlooker based on the trained onlooker detection model.

In some disclosed examples, the method further includes invoking, by executing a computer-readable instruction with the one or more processors, an onlooker detection model based on satisfaction of at least one contextual parameter. In some disclosed examples, the method further includes detecting, by executing a computer-readable instruction with the one or more processors, the onlooker based on the invoked onlooker detection model.

In some disclosed examples, the at least one contextual parameter includes one or more of a location of the computing device, an environment associated with use of the computing device, or a content type associated with information presented on the display of the computing device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   at least one memory;
   computer-readable instructions; and
   processor circuitry to execute the computer-readable instructions to:
     determine, based on location data associated with a computing device, whether the computing device has moved from a private, secure environment to a public, unsecure environment;
     automatically invoke an onlooker detection model of the computing device in response to determining that the computing device has moved from the private, secure environment to the public, unsecure environment, the onlooker detection model to detect an onlooker based on data collected by a sensor associated with the computing device; and
     automatically invoke a security feature of a display of the computing device in response to detection of the onlooker.

2. The apparatus as defined in claim 1, wherein the sensor includes at least one of an infrared sensor, a radio detection and range sensor, a light detection and range sensor, an ultra-wideband sensor, or a time-of-flight sensor.

3. The apparatus as defined in claim 1, wherein the data is anonymous depth data not including and not derived from image data.

4. The apparatus as defined in claim 1, wherein the processor circuitry is to differentiate the onlooker from an end user of the computing device.

5. The apparatus as defined in claim 1, wherein the processor circuitry is to detect the onlooker within a field of view of the sensor.

6. The apparatus as defined in claim 1, wherein the processor circuitry is to detect the onlooker is within a proximity threshold defined by a first boundary distance from the sensor and a second boundary distance from the sensor, the second boundary distance spaced apart from the first boundary distance, the first and second boundary distances beyond a distance at which an end user of the computing device is to be located relative to the sensor.

7. The apparatus as defined in claim 1, wherein the security feature is to at least one of reduce a size of information presented on a screen of the display, narrow a viewable width of information presented on a screen of the display, or blur information presented on a screen of the display.

8. The apparatus as defined in claim 1, wherein the security feature is to either decrease a brightness of a backlighting projected onto a screen of the display, or redirect the backlighting.

9. The apparatus as defined in claim 1, wherein the private, secure environment is a home or a workplace of an end user of the computing device.

10. The apparatus as defined in claim 1, wherein the location data is obtained from a GPS receiver or radio hardware of the computing device.

11. A non-transitory computer-readable storage medium comprising instructions that, when executed, cause one or more processors of an electronic device to at least:
    determine, based on location data associated with the electronic device, whether the electronic device has moved from a private, secure environment to a public, unsecure environment;
    automatically invoke an onlooker detection model in response to determining that the electronic device has moved from the private, secure environment to the public, unsecure environment, the onlooker detection model to detect an onlooker based on data collected from a sensor associated with the electronic device; and
    automatically change a display of the electronic device in response to the detection of the onlooker.

12. The non-transitory computer-readable storage medium as defined in claim 11, wherein the instructions, when executed, cause the one or more processors to differentiate the onlooker from an end user of the electronic device.

13. The non-transitory computer-readable storage medium as defined in claim 11, wherein the instructions, when executed, cause the one or more processors to automatically change the display in response to detection of the onlooker within a field of view of the sensor.

14. The non-transitory computer-readable storage medium as defined in claim 11, wherein the instructions, when executed, cause the one or more processors to automatically change the display in response to detection of the onlooker within a proximity threshold defined by a first boundary distance from the sensor and a second boundary distance from the sensor, the second boundary distance spaced apart from the first boundary distance, the first and second boundary distances located beyond a distance at which an end user of the electronic device is to be located relative to the sensor.

15. An electronic device, comprising:
processor circuitry;
environment detection instructions to cause the processor circuitry to determine, based on location data associated with the electronic device, whether the electronic device has moved from a private, secure environment to a public, unsecure environment;
model invoker instructions to cause the processor circuitry to invoke an onlooker detection model in response to a determination that the electronic device has moved from the private, secure environment to the public, unsecure environment, the onlooker detection model to detect an onlooker based on data collected by a sensor associated with the electronic device; and
security manager instructions to cause the processor circuitry to cause a change in a characteristic of a display of the electronic device in response to detection of the onlooker.

16. The electronic device as defined in claim 15, wherein the sensor includes at least one of an infrared sensor, a radio detection and range sensor, a light detection and range sensor, an ultra-wideband sensor, or a time-of-flight sensor.

17. The electronic device as defined in claim 15, wherein the data is anonymous depth data that does not include, and is not derived from, image data.

18. The electronic device as defined in claim 15, wherein the onlooker detector model is to differentiate the onlooker from an end user of the electronic device.

19. The electronic device as defined in claim 15, further including presence evaluator instructions to cause the processor circuitry to detect the onlooker within a field of view of the sensor.

20. The electronic device as defined in claim 15, further including proximity evaluator instructions to cause the processor circuitry to detect the onlooker is within a proximity threshold defined by a first boundary distance from the sensor and a second boundary distance from the sensor, the second boundary distance spaced apart from the first boundary distance, the first and second boundary distances located beyond a distance at which an end user of the electronic device is to be located relative to the sensor.

21. The electronic device as defined in claim 15, wherein the change in the characteristic of the display is to at least one of reduce a size of information being presented on a screen of the display, narrow a viewable width of information being presented on a screen of the display, or blur information being presented on a screen of the display.

22. The electronic device as defined in claim 15, wherein the change in the characteristic of the display is to either decrease a brightness of a backlighting being projected onto a screen of the display, or redirect the backlighting.

* * * * *